(12) United States Patent
White et al.

(10) Patent No.: US 9,973,473 B2
(45) Date of Patent: May 15, 2018

(54) METHODS, SYSTEMS, AND COMPUTER READABLE MEDIA FOR RAPID FILTERING OF OPAQUE DATA TRAFFIC

(71) Applicants: The University of North Carolina at Chapel Hill, Chapel Hill, NC (US); The Regents of the University of Michigan, Ann Arbor, MI (US); SRI International, Menlo Park, CA (US)

(72) Inventors: Andrew Maxwell White, Chapel Hill, NC (US); Fabian Monrose, Chapel Hill, NC (US); Srinivas Krishnan, Berkeley, CA (US); Phillip Andrew Porras, Cupertino, CA (US); Michael Donald Bailey, Ypsilanti, MI (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 22 days.

(21) Appl. No.: 14/387,967

(22) PCT Filed: Mar. 13, 2013

(86) PCT No.: PCT/US2013/031044
§ 371 (c)(1),
(2) Date: Sep. 25, 2014

(87) PCT Pub. No.: WO2013/187963
PCT Pub. Date: Dec. 19, 2013

(65) Prior Publication Data
US 2015/0052601 A1 Feb. 19, 2015

Related U.S. Application Data

(60) Provisional application No. 61/618,648, filed on Mar. 30, 2012.

(51) Int. Cl.
*G06F 9/00* (2006.01)
*H04L 29/06* (2006.01)

(52) U.S. Cl.
CPC ...... *H04L 63/0245* (2013.01); *H04L 63/1416* (2013.01)

(58) Field of Classification Search
CPC . H04L 63/0245; H04L 63/0428; H04L 69/22; H04L 63/20; H04L 63/145;
(Continued)

(56) References Cited

U.S. PATENT DOCUMENTS 7,624,446 B1* 11/2009 Wilhelm ............. H04L 63/1416
380/255
7,681,032 B2* 3/2010 Peled ................. H04L 63/0245
713/154
(Continued)

FOREIGN PATENT DOCUMENTS

EP    2 346 205 A1    7/2011

OTHER PUBLICATIONS

Jung et al., "Fart Portscan Detection Using Sequential Hypothesis Testing", IEEE Symposium on Security and Privacy, May 2004, pp. 1-15.*
(Continued)

*Primary Examiner* — Farid Homayounmehr
*Assistant Examiner* — Lizbeth Torres-Diaz
(74) *Attorney, Agent, or Firm* — Jenkins, Wilson, Taylor & Hunt, P.A.

(57) ABSTRACT

Methods, systems, and computer readable media for rapid filtering of opaque data traffic are disclosed. According to one method, the method includes receiving a packet containing a payload. The method also includes analyzing a portion of the payload for determining whether the packet contains compressed or encrypted data. The method further
(Continued)

includes performing, if the packet contains compressed or encrypted data, at least one of sending the packet to an opaque traffic analysis engine for analysis, discarding the packet, logging the packet, or marking the packet.

16 Claims, 12 Drawing Sheets

(58) Field of Classification Search
CPC ........... H04L 63/1416; H04L 2463/144; H04L 63/1441; G06F 21/562; G06F 21/57; G06F 2221/034
See application file for complete search history.

(56) References Cited

U.S. PATENT DOCUMENTS

| | | | | |
|---|---|---|---|---|
| 7,797,411 | B1* | 9/2010 | Guruswamy | G06F 15/173 709/223 |
| 7,835,361 | B1 | 11/2010 | Dubrovsky et al. | |
| 8,087,079 | B2* | 12/2011 | Ben-Itzhak | G06F 21/563 726/22 |
| 8,341,724 | B1* | 12/2012 | Burns | H04L 63/0428 370/235 |
| 2005/0047333 | A1* | 3/2005 | Todd | H04L 29/06027 370/229 |
| 2005/0265331 | A1* | 12/2005 | Stolfo | G06F 21/552 370/389 |
| 2005/0281291 | A1* | 12/2005 | Stolfo | G06F 21/552 370/506 |
| 2009/0281984 | A1* | 11/2009 | Black | H04L 43/026 |
| 2010/0287383 | A1* | 11/2010 | Conte | G06F 21/577 713/189 |
| 2011/0016522 | A1* | 1/2011 | Sheppard | G06F 21/563 726/22 |
| 2011/0305141 | A1* | 12/2011 | Horovitz | H04L 43/18 370/241 |

OTHER PUBLICATIONS

Notification of Transmittal of the International Search Report and the Written Opinion of the International Searching Authority, or the Declaration for International Application No. PCT/US2013/031044 (dated Jan. 8, 2014).
Ahmed et al., "On Improving the Accuracy and Performance of Content-Based File Type Identification," In Proceedings of the Australasian Conference on Information Security and Privacy, pp. 44-59, (2009).
Ahmed et al., "Fast content-based file-type identification," In Proceedings of the 25th Symposium on Applied Computing, pp. 1-20, (2010).
Amirani et al., "A New Approach to Content-Based File Type Detection," In Proceedings of the 13th IEEE Symposium on Computers and Communications, pp. 1103-1108, (2008).
Bonfiglio et al. "Revealing Skype Traffic: When Randomness Plays With You," SIGCOMM '07, pp. 37-48, (2007).
Bussgang et al., "Truncated Sequential Hypothesis Tests," Memorandum RM-4268-ARPA, (Nov. 1964).
Calhoun et al., "Predicting the Types of File Fragments," Digital Investigation 5, S14-S20, (2008).
Cascarano et al., "An Experimental Evaluation of the Computational Cost of a DPI Traffic Classifier," In Global Telecommunications Conference, pp. 1-8, (2009).
Chiang et al., "A Case Study of the Rustock Rootkit and Spam Bot," In Proceedings of the First Workshop on Hot Topics in Understanding Botnets, (2007).
Conover et al., "A Kolmogorov Goodness-of-Fit Test for Discontinuous Distributions," Journal of the American Statistical Association, vol. 67, No. 339, pp. 591-596, (1972).
Conti et al., "Automated Mapping of Large Binary Objects Using Primitive Fragment Type Classification," Digital Investigation 7, S3-S12, (2010).
Dorfinger et al., "Real-time Detection of Encrypted Traffic Based on Entropy Estimation," Master Thesis, Salzburg University of Applied Sciences, (2010).
Dorfinger et al. "Entropy-based Traffic Filtering to Support Real-Time Skype Detection," In Proceedings of the 6th International Wireless Communications and Mobile Computing Conference, pp. 747-751, (2010).
Dorfinger et al., "Entropy Estimation for Real-Time Encrypted Traffic Identification," In Traffic Monitoring and Analysis, vol. 6613 of Lecture Notes in Computer Science, pp. 164-171, (2011).
Dreger et al., "Operational Experiences with High-Volume Network Intrusion Detection," In Proceedings of the 11th ACM conference on Computer and Communications Security, (2004).
Malhotra, Paras, "Detection of Encrypted Streams for Egress Monitoring," Master's thesis, Iowa State University, (2007).
Maurer, Ueli M. "A Universal Statistical Test for Random Bit Generators," Journal of Cryptology, vol. 5, No. 2, pp. 1-19, (1992).
McDaniel, Mason B., "An Algorithm for Content-Based Automatic File Type Detection," Master's thesis, James Madison University, (2001).
McDaniel et al., "Content Based File Type Detection Algorithms," In Proceedings of the Hawaii International Conference on System Sciences, (2003).
Moody et al., "SADI—Statistical Analysis for Data Type Identification," Proceedings of the Third International Workshop on Systematic Approaches to Digital Forensic Engineering, pp. 41-54, (2008).
Olivain et al., "Detecting Subverted Cryptographic Protocols by Entropy Checking," Research Report LSV-06-13, Laboratoire Specification et Verification, ENS Cachan, France, (2006).
Paninski, Liam, "Estimation of Entropy and Mutual Information," Neural Computation, 15(6): pp. 1191-1253, (2003).
Paninski, Liam, "Estimating Entropy on m Bins Given Fewer than m Samples," IEEE Transactions on Information Theory, 50(9): pp. 2200-2203, (2004).
Paninski et al., "Undersmoothed Kernel Entropy Estimators." IEEE Transactions on Information Theory, 54(9), (2008).
Papadogiannakis et al., "Improving the Accuracy of Network Intrusion Detection Systems Under Load Using Selective Packet Discarding," In Proceedings of the Third European Workshop on System Security, EUROSEC, (2010).
Phunchongharn et al., "File Type Classification for Adaptive Object File System," In Proceedings of the IEEE Region 10 Technical Conference, pp. 1-4, (2006).
Roussev et al., "File Fragment Classification—The Case for Specialized Approaches," IEEE International Workshop on Systematic Approaches to Digital Forensic Engineering, pp. 3-14, (2009).
Shamir et al., "Playing Hide and Seek with Stored Keys," In Proceedings of the Third International Conference on Financial Cryptography, pp. 1-9, (1999).
Somner, Robin, "Viable Network Intrusion Detection in High-Performance Environments," Doktorarbeit, Technischen Universitaat Munchen, Munich, Germany, (2005).
Dreger et al., "Dynamic Application-Layer Protocol Analysis for Network Intrusion Detection," In Proceedings of the 15th USENIX Security Symposium, (2006).
Dunham et al., "Classifying File Type of Stream Ciphers in Depth Using Neural Networks," ACS/IEEE International Conference on Computer Systems and Applications, (2005).
Erbacher et al., "Identification and Localization of Data Types Within Large- Scale File Systems," In Proceedings of the Second International Workshop on Systematic Approaches to Digital Forensic Engineering, pp. 55-70, (2007).
Fielding et al., "RFC 2616, Hypertext Transfer Protocol—HTTP/1.1", (1999).
Haggerty et al., "FORSIGS: Forensic Signature Analysis of the Hard Drive for Multimedia File Fingerprints," In Proceedings of IFIP International Information Security Conference, pp. 1-12, (2006).

(56) References Cited

OTHER PUBLICATIONS

Hall et al., "Sliding Window Measurement for File Type Identification." ManTech Security and Mission Assurance, (2006).

Harris, Ryan M., "Using Artificial Neural Networks for Forensic File Type Identification," Master's thesis, Purdue University, (2007).

Jaber et al., "Enhancing Application Identification by Means of Sequential Testing," In Proceedings of the 8th International IFIP-TC 6 Networking Conference, (2009).

Jung et al., "Fast Portscan Detection Using Sequential Hypothesis Testing," In IEEE Symposium on Security and Privacy, pp. 1-15, (2004).

Karresand et al., "File Type Identification of Data Fragments by their Binary Structure," In Proceedings of the IEEE Workshop on Information Assurance, pp. 140-147, (Jun. 2006).

Karresand et al., "Oscar—File Type Identification of Binary Data in Disk Clusters and RAM Pages," In Proceedings of the IFIP International Security Conference: Security and Privacy in Dynamic Environments, pp. 413-424, (2006).

Li et al., "Forensic Analysis of Document Fragment Based on SVM," In Proceedings of the 2006 International Conference on Intelligent Information Hiding and Multimedia Signal Processing, (2006).

Li et al., "Fileprints: Identifying File Types by n-gram Analysis," In Proceedings of the IEEE Workshop on Information Assurance and Security, pp. 64-71, (Jun. 2005).

Lyda et al., "Using Entropy Analysis to Find Encrypted and Packaged Malware," IEEE Security and Privacy, 5: pp. 40-45, (2007).

Stolfo et al., "Fileprint Analysis for Malware Detection," Technical report, Columbia University, pp. 1-12, (2005).

Tabish et al., "Malware Detection Using Statistical Analysis of Byte-Level File Content." In KDD Workshop on CyberSecurity and Intelligence Informatics, pp. 23-31, (2009).

Thomas et al., "The Koobface Botnet and the Rise of the Social Malware," in Malicious and Unwanted Software (Malware), pp. 63-70, (2010).

Trammell et al., "Identifying Skype Traffic in a Large-Scale Flow Data Repository," In Traffic Monitoring and Analysis, vol. 6613 of Lecture Notes in Computer Science, pp. 72-85. 2011.

Veenman, Cor J., "Statistical Disk Cluster Classification for File Carving," In Proceedings of the Third International Symposium on Information Assurance and Security, pp. 393-398, (2007).

Wald, A., "Sequential Tests of Statistical Hypotheses". The Annals of Mathematical Statistics, 16(2): pp. 117-186, (1945).

Wald et al., "Optimum Character of the Sequential Probability Radio Test," Annals of Mathematical Statistics, 19(3): pp. 326-339, (1948).

Wang et al., "Anomalous Payload-Based Network Intrusion Detection." In Recent Advances in Intrusion Detection, pp. 203-222, (2004).

Weber et al., "A Toolkit for Detecting and Analyzing Malicious Software," In Proceedings of the 18th Annual Computer Security Applications Conference, pp. 423-431, (2002).

Zhang et al., "An Approach to Detect Executable Content for Anomaly Based Network Intrusion Detection." In IEEE International Parallel and Distributed Processing Symposium, pp. 1-8, (2007).

\* cited by examiner (a) trace1

(b) trace2

(a) text/plain (top: known encodings (transparent), bottom: opaque)

(a) Packets (b) Alerts

METHODS, SYSTEMS, AND COMPUTER READABLE MEDIA FOR RAPID FILTERING OF OPAQUE DATA TRAFFIC

PRIORITY CLAIM

This application claims the benefit of U.S. Provisional Patent Application Ser. No. 61/618,648, filed Mar. 30, 2012; the disclosure of which is incorporated herein by reference in its entirety.

GOVERNMENT INTEREST

This invention was made with government support under Grant Nos. 0852649, 1017318, and CNS-0831170 awarded by the National Science Foundation and W911NF-06-1-0316 awarded by the Army Research Office. The government has certain rights in this invention.

TECHNICAL FIELD

The subject matter described herein relates to communications networks. More specifically, the subject matter relates to methods, systems, and computer readable media for rapid filtering of opaque data traffic.

BACKGROUND

In communications networks, packets may be inspected for various purposes, such as policy enforcement. For example, deep packet inspection (DPI) systems may be used in networks to inspect packet payloads. Generally, information in a packet payload may be used when security or other policies require determinations based on information not accurately reflected in the packet header. However, DPI systems cannot generally derive useful information from opaque (e.g., compressed or encrypted) data traffic. Since DPI resources are generally wasted attempting to inspect opaque data traffic, it may be beneficial to filter opaque data traffic such that the opaque traffic is treated differently by DPI systems. By filtering or offloading opaque traffic, DPI systems may devote more of their resources to transparent (e.g., not compressed and not encrypted) data traffic. As such, DPI systems that filter opaque data traffic may more efficiently use their resources, e.g., to more thoroughly inspect transparent packets.

Accordingly, there exists a need for methods, systems, and computer readable media for rapid filtering of opaque data traffic.

SUMMARY

Methods, systems, and computer readable media for filtering of opaque data traffic are disclosed. According to one method, the method includes receiving a packet containing a payload. The method also includes analyzing a portion of the payload for determining whether the packet contains compressed or encrypted data. The method further includes performing, if the packet contains compressed or encrypted data, at least one of sending the packet to an opaque traffic analysis engine for analysis, discarding the packet, logging the packet, or marking the packet.

A system for filtering opaque data traffic is also disclosed. The system may include a communications interface configured to receive a packet containing a payload. The system includes an opaque traffic filter (OTF) module configured to analyze a portion of the payload for determining whether the packet contains compressed or encrypted data and to perform, if the packet contains compressed or encrypted data, at least one of sending the packet to an opaque traffic analysis engine for analysis, discarding the packet, logging the packet and marking the packet. The system may include a data acquisition and generation card (DAG), and the OTF module may be implemented as a component of this DAG.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
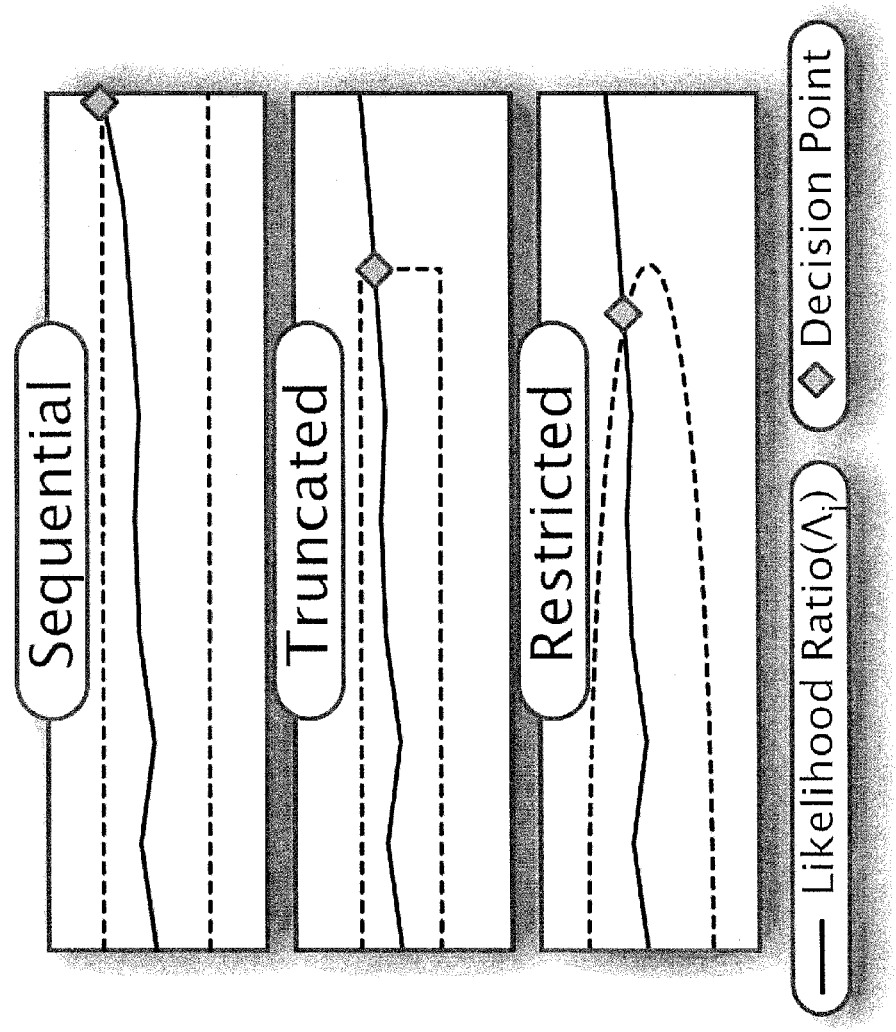
FIG. 1 is a diagram illustrating decision points associated sequential probability ratio tests according to an embodiment of the subject matter described herein.

The subject matter described herein discloses methods, systems, and computer readable media for rapid filtering of opaque data traffic. As society becomes increasingly reliant on computer systems, the potential harms resulting from their insecure operation are far reaching—from legal, social, and economic harms to psychological and even physical harms (e.g., cyber physical systems). Alongside requirements (e.g., confidentiality) and mechanisms (e.g., authentication), policies that define what actions are allowed, or disallowed, are a key building block of computer security and an important factor in minimizing these harms. The successful network-level monitoring of these policies via Intrusion Detection Systems (IDS), or enforcement of these policies via firewalls, both critically depend on scalable and accurate techniques for inspecting traffic.

Deep packet inspection (DPI) is a common method for enforcing policy or detecting violations, especially when such policies require determinations based on information not accurately reflected by network ports, protocols, or hosts. Since DPI must deal with huge volumes and significant heterogeneity of traffic, DPI designers often trade off accuracy of detection with resource demands [42]. DPI systems cannot generally derive useful information from opaque (e.g., encrypted or compressed) packets; thus, we propose improving the performance versus quality curve through the quick and accurate winnowing, e.g., filtering, of opaque traffic, and evaluate a number of techniques for doing so.

By quickly and accurately filtering opaque traffic, multiple benefits may be realized. First, such techniques can improve the performance of DPI engines by quickly and accurately separating out low-value packets from the data stream being inspected; this is particularly important in high-performance environments, where the sheer volume of traffic can be staggering. At one campus, encrypted traffic alone appears to make up an average of 13% of the total traffic, based solely on port and protocol assumptions. In addition, some sources indicate that streaming video may account for 35% or more of peak network traffic.

Second, operators may wish to enforce and monitor policies within their network (e.g., flagging encrypted packets tunneled over unencrypted connections, an odd practice used by botmasters to hide command-and-control messages in otherwise mundane HTTP traffic [8, 46]). Similarly, one might wish to flag unencrypted traffic where encrypted traffic is expected, such as might occur if an SSH connection is subverted [35].

Opaque traffic identification has value that extends beyond policy monitoring and enforcement to forensics applications. For example, network flight recording services (e.g., Netwitness) could utilize fast techniques for opaque traffic identification to make better storage efficient decisions on what is saved, discarded, compressible, etc. Additionally, winnowing traffic partitions the data stream into distinct classes, enabling specialized analysis such as scanning plaintext for malicious JavaScript, exploiting side-channels to attack encrypted traffic, or identifying applications tunneled over other protocols (e.g., video traffic may be tunneled over HTTP).

Unfortunately, the identification of opaque network traffic can be quite challenging. While signatures can identify many known opaque protocols (e.g., SSL/TLS, SSH), some protocols (e.g., Bittorrent's Message Stream Encryption) are specifically designed to avoid signature matching. In addition, signature-based approaches for identifying new opaque protocols require constructing and deploying new signatures for each new protocol. More importantly, existing techniques for identifying opaque data often require examination of a large number of bytes, which can be computationally and memory intensive on high-speed networks [7, 14].

We address these challenges by providing new methods for quickly and accurately determining whether a packet is opaque. We also provide a comparison of these methods to other approaches. In particular, we explore the use of small-sample fixed-size hypothesis tests and sequential hypothesis tests, concentrating on techniques which can operate on small sample sizes because minimizing payload inspection may improve performance as it eliminates the need to examine more than n bytes of each packet. In some embodiments, filtering techniques used may be protocol-agnostic, allowing for the detection of opaque traffic regardless of the protocol.

We evaluate our methods on both offline traces and online packet streams at two major research universities. As a first step, we perform an extensive offline parameter-space exploration designed to illuminate details of the inherent trade-offs between speed and accuracy. We eliminate candidate algorithms, such as entropy-based tests, that have uniformly equivalent or poorer accuracy at higher performance cost. Further evaluation on traces indicates that techniques disclosed herein are able to identify opaque traffic with 95% accuracy. With the assistance of a network operator, we were able to determine that many of the error cases were in fact due to mislabeled HTTP content-types.

Finally, we construct a prototype implementation as a preprocessor to a Snort IDS. Using a high-speed DAG card, we evaluate our prototype side-by-side with an unmodified Snort instance on identical traffic streams. Our preprocessor enables the Snort IDS to process 147% more packets and to handle a 1.2 Gbps peak traffic load with zero losses. Our approach identifies 89% of payload-carrying TCP packets on our network as opaque, underscoring the prevalence of this class of traffic and the importance of specialized techniques for managing modem networks.

I. Approach

Recall that an important portion of some aspects of the present subject matter is to minimize the amount of a packet's payload that we inspect, as doing otherwise is both computationally and memory intensive on high-speed networks [7, 14]. These overheads severely restrict the numbers of samples available to us for any of the tests we explore. Therefore, for the remaining discussion, we propose detectors based on small-sample fixed-size hypothesis tests and sequential hypothesis testing. The latter allows us to make decisions quickly by examining only as many samples as needed to support a given hypothesis.

Our detectors are based on determining whether the bytes examined are drawn from a uniform distribution or some other, unknown, distribution. Our first instinct, when faced with the problem of measuring the uniformity of a set of samples, was to use entropy-based measures. However, as we show later, accurate entropy testing requires significantly more samples than is practical in our setting, and is less efficient than more direct methods, e.g., those based on the samples themselves rather than a derived statistic, such as entropy.

There is an obvious caveat to approaching this problem as one of determining the uniformity of data: compressed data will have similar byte distributions as encrypted data (e.g., in both cases, the data will exhibit relatively high entropy). In some embodiments, we consider these two cases as belonging to the same equivalence class of "opaque" objects as far as DPI engines are concerned. That is, regardless of whether the packets that belong to a session are compressed versus encrypted, they will be forced to go through the slow path wherein the engine analyzes all packets of these sessions, but still fail to derive any useful information. In such embodiments, from the perspective of DPI engines, there is no value in attempting to analyze these packets. As Cascarano et al. [7] observed in their experimental evaluations, these slow paths incurred CPU overheads (in terms of clock ticks) that were several orders of magnitude higher than the average case for transparent traffic.

A. Preliminaries

In what follows, we examine approaches that can be broadly classified under two different models, which we refer to as operating on the entropy or byte-value domains. For the entropy domain, the basic unit is the (byte-) entropy of a block of bytes, where the number of bytes n in a block is parameterized. In other words,

TABLE I

| Symbol | Meaning |
| --- | --- |
| n | size (in bytes) of a block |
| k | size of domain (e.g., 256 for bytes) |
| N | (maximum) number of payload bytes |
| M | (maximum) number of samples |
| $v_i$ | observation (byte) |
| $w_i$ | observation (block) |
| V | sequence of observations (bytes) |
| w | sequence of observations (blocks) |
| α | expected false negative rate |
| β | expected false positive rate |
| δ | alternative hypothesis weight |
| T | offset (in bytes) | if X is a random variable in the entropy domain, then the support of X is the set of all possible values for the byte-entropy of n bytes. If X is a random variable in the byte-value domain, then the support of X is the set of integers 0 through 255. That is, for the byte-value domain, the basic unit is simply the byte.

Before delving into details of the various tests we explore, we first present necessary notation, summarized in Table I. To represent the packet payload, let $v=\{v_1, v_2, \ldots, v_N\}$ be a sequence of observations (e.g., payload bytes), such that $v_i \in \{0, 1, \ldots, k-1\} \forall i \in \{1, \ldots, N\}$. That is, for a sequence v of bytes, k=256. In the entropy domain, we operate on a sequence w of blocks of bytes=$\{v_1, v_2, \ldots, v_{N/n}\}$.

Since our goal is to discard opaque traffic (albeit encrypted or compressed), we let our null hypothesis be that the packet is opaque and our general alternative be that the packet is transparent. For all tests, let $\mathcal{H}_0$ be the hypothesis that the $v_i$ are approximately uniformly distributed (e.g., the packet is compressed or encrypted), and let $\mathcal{H}_1$ be the alternative hypothesis, i.e., that the $v_i$ are distributed according to some distribution that is not uniform (e.g., corresponding to a transparent packet). For those tests that require specification of the probability density for the alternative hypothesis (e.g., the likelihood ratio test and the sequential tests), we use a simple alternative hypothesis based on the intuition that plaintext packets will have a higher frequency of bytes whose values are less than 128 (as are the ASCII values). We parameterize this distribution by setting a to the cumulative density of those values. For example, at σ=0.75 the alternative hypothesis is that 75% of the bytes in the packet have values less than 128.

Notice that while the density function for the byte-value domain is well-known and straightforward to compute, the entropy domain is more complicated. For many of the tests we examine, we need to evaluate the probability mass function (PMF) over possible values for the sample entropy of n bytes for each hypothesis. Intuitively, a formal derivation of the mass function may be based on the fact that the sample entropy of n bytes is the same regardless of the arrangement of those bytes. We can then enumerate the possible ways of arranging n bytes to calculate the corresponding PMF.

Formally, let $S_n$ be the set of all possible values for the sample entropy of n bytes and let H be a random variable taking values in $S_n$. We need to find the probability $P[H=H(v)|\mathcal{H}_i]$ that the sample entropy H(v) of a sequence of bytes v equals some value H under each hypothesis (i.e., each of $\{\mathcal{H}_0, \mathcal{H}_1\}$).

More formally, define $x=\{x_0, x_1, \ldots, x_{k-1}\}$ as $$x_i = \sum_{j=0}^{n} I(v_j = i) \forall i \in \{0, 1, \ldots, k-1\}$$

where I(•) is the indicator function. Note that $x_i$ is the count of the number of elements in v that are equal to i, i.e., the multiplicity of i. Then the sample entropy (in bits) is calculated as:

$$H(v) = h(x) = \sum_{i=0}^{k-1} \frac{x_i}{n} \log_2 \frac{x_i}{n}$$

We can express our desired probability as the sum over all possible x which map to the same sample entropy:

$$P[H = H(v) | H_i] = \sum_{x \, s.t \, H(v)=h(x)} P[X = x | H_i] \quad (1)$$

Since X is a vector-valued random variable with a multinomial distribution with length n and probabilities p={$p_0$, $p_2$, ..., $p_{k-1}$} ∋ 0<$p_i$<1 $\forall i \in \{0, 1, \ldots, k-1\}$ and $\Sigma_{i=0}^{k-1} p_i = 1$, the corresponding probability mass function [48] is:

$$P[X = x | n, p] = \binom{n}{x_0, x_1, \ldots, x_{k-1}} p_0^{x_0} p_1^{x_1} \ldots p_{k-1}^{x_{k-1}}$$

If we consider the equiprobable case (e.g., $$\left(e.g., \, p_i = \frac{1}{k} \forall i \in \{0, 1, \ldots, k-1\}\right)$$

then we can derive a closed form for computing the probability mass function (see our derivation in Appendix A). Unfortunately, we know of no closed form for the entropy of v without the equiprobable assumption. However, we can utilize Equation 1, where the sum is over the permutations of the multiset x, and calculate the mass function by exhaustively searching the space of possible combinations of n bytes for any specified alternative. Since we need a number of blocks for each of our tests, we keep n relatively small (i.e., 8 bytes), thereby making such a search feasible.

We implemented such an enumeration using NVIDIA's CUDA GPU parallel programming toolkit, yielding a PMF for n=8. The result matched Monte-Carlo simulations for high-probability entropy values, but revealed a number of unlikely values missed by the simulations. The resulting PMF consists of twelve distinct entropy values and associated probabilities, all of which can be stored in less than 200 bytes.

B. Fixed Sample Size Hypothesis Testing

In our search for the best performing test for our goals, we examine several fixed sample-size hypothesis tests. There are a number of standard techniques for testing uniformity; however, many of these are designed for testing the uniformity of the outputs of a pseudorandom number generator, and thus assume access to a large number of samples (e.g., [31]). These tests are unsuitable in our context because our sample size is extremely limited. We instead focus on two appropriate fixed-size tests: the likelihood ratio test and the discrete Kolmogorov-Smirnov test. We discuss each in turn.

Likelihood Ratio Test: A well-known theorem of hypothesis testing is the Neyman-Pearson lemma, which states that the most powerful test, e.g., that with the lowest expected false positive rate for a given false negative rate, of one simple hypothesis against another is the likelihood ratio test [48]. For a single sample, the likelihood ratio statistic is simply the ratio of the likelihood of the sample under the alternative hypothesis to the likelihood of the sample under the null hypothesis. These likelihoods are replaced with the corresponding joint likelihoods in the case of multiple samples.

Formally, let X be a random variable with probability distribution function $f(x|\theta)$. Suppose we wish to test the simple null hypothesis $\mathcal{H}_0$: $\theta=\theta_0$ against the simple alternative $\mathcal{H}_1$: $\theta=\theta_1$ given a random sample $\overline{X}=X_1, X_2, \ldots X_M$. Then the Neyman-Pearson lemma [49, Theorem 10.1] states that the most powerful test of $\mathcal{H}_0$ against $\mathcal{H}_1$ is that where one rejects $\mathcal{H}_0$ if $\Lambda(\overline{X}) \geq q$ and accepts $\mathcal{H}_0$ if $\Lambda(\overline{X}) < q$, where q is determined by the desired level of statistical significance and $$\Lambda(\overline{X}) = \frac{\Pi_i f(X_i | \theta_i)}{\Pi_i f(X_i | \theta_i)},$$

for $i \in \{1, \ldots, M\}$ (assuming the samples are independent). In other words, $\Lambda(\overline{X})$ is the likelihood ratio, e.g., the ratio of the likelihood of the sample under the alternative to the likelihood of the sample under the null hypothesis.

Discrete Kolmogorov-Smirnov Test: Another appropriate test for determining whether a sample is drawn from a particular distribution (or two samples are drawn from the same distribution) is the Kolmogorov-Smirnov (K-S) test. The K-S test is often used because of its generality and lack of restricting assumptions. The test is based on quantifying the difference between the cumulative distribution functions of the distributions of interest. However, we note that the traditional Kolmogorov-Smirnov test is only valid for continuous distributions, and Conover has already shown that the p-values for the continuous K-S test applied to discrete or discontinuous distributions can differ substantially from those of the discrete analog. Therefore, unlike the approach by Malhotra [30] that used the unmodified KS test, we apply the discrete version as described by Conover [10].

Lastly, we note that Pearson's $X^2$ test also seems appropriate in this setting. Unfortunately, Pearson's $X^2$ test makes a number of assumptions which are not valid in our case. In particular, the samples are assumed to be independent, the sample size is assumed to be large, and the expected cell counts are assumed to be non-zero. Since our goal is to examine as few bytes as possible, these latter two assumptions are violated. Nevertheless, we include such analyses for the sake of comparison, but omit the derivation.

C. Sequential Hypothesis Testing

Sequential analysis has a long history, dating back to Abraham Ward and others during World War II [19]. For our purposes, sequential analysis satisfies one of our criteria, namely, that the test examine as few bytes of the payload as possible. In fact, Wald and Wolfowitz have shown that, among all tests of two simple hypotheses with fixed error probabilities, the sequential probability ratio test (SPRT) minimizes the expected number of samples required for a decision under either hypothesis [51]. This is not surprising, as the SPRT is an extension of the likelihood ratio test, which, as mentioned earlier, is the statistically most powerful test of two simple hypotheses. Sequential testing works by examining samples one-by-one, rather than all at once, and evaluating a decision function at each sample. This allows the test to stop examining samples as soon as it has found enough "evidence" for one hypothesis or the other. FIG. 1 depicts such a test along with two variants (discussed below).

Specifically, let $\alpha = P(\text{accept } \mathcal{H}_1 | \mathcal{H}_0)$ be the probability of a false negative, that is, an erroneous prediction that the $v_i$ are not uniformly distributed; similarly, define $\beta = P(\text{accept } \mathcal{H}_0 | \mathcal{H}_1)$ as the probability of a false positive. In order to perform the test, we iterate through some sequence of samples $X_1, X_2, \ldots$; according to Wald's theory of sequential hypothesis testing [49], we choose at each iteration m one of three actions: accept $\mathcal{H}_0$ accept $\mathcal{H}_1$, continue, as follows:

accept $H_0$ if $\Lambda_m(X_1, X_2, \ldots, X_m) \leq g_0(m)$ accept $H_1$ if $\Lambda_m(X_1, X_2, \ldots, X_m) \geq g_1(m)$ continue      otherwise.

Setting $$g_0(m) = \frac{\beta}{1-\alpha} \text{ and } g_1(m) = \frac{1-\beta}{\alpha}$$

gives the desired probabilities of false positives and false negatives.

A known drawback of the sequential probability ratio test is that it may not terminate within an acceptable number of samples. We alleviate this concern by exploring two variants (see FIG. 1), which we refer to as the truncated and restricted SPRTs. For the truncated SPRT, we specify a maximum number of samples which the test is allowed to examine. The truncated SPRT proceeds as the standard test with the following exception: if this limit is reached without making a decision, then the fixed-size likelihood ratio test is applied to the samples examined so far. The restricted SPRT, on the other hand, works by sloping the decision boundaries such that they intercept the axis after the given number of samples. For the restricted case, we follow the approach suggested by Bussgang and Marcus [6], setting:

$$g_0(m) = -b(1 - m/M)^{r_0}$$

$$g_1(m) = a(1 - m/M)^{r_1}$$

where M is the maximum number of samples allowed. This yields gently sloping decision boundaries (see FIG. 1). Quantities a, b, $r_0$, and $r_1$ are determined by the desired probabilities of error α and β:

$$b = \ln\beta\left(\frac{1}{ME_0} - 1\right) \quad r_0 = 1/b$$

$$a = -\ln\alpha\left(\frac{ME_1 + 1}{ME_1 + 2}\right) \quad r_1 = 1/a$$

where $E_0$ and $E_1$ are the expected number of samples required to make a decision under the null and alternative hypotheses, respectively. For simplicity, we set $r_0=1/b$ and $r_1=1/a$.

II. Evaluation

To assess the accuracy and performance of the techniques in § I, we collected traces from two different large campus networks (labeled trace1 and trace2). Both traces were collected over several hours during a weekday. For simplicity, we only consider IPv4 TCP traffic. To obtain ground truth, we instrumented the Bro IDS to output packet-level information on flows of interest. We labeled each packet by protocol using Bro's dynamic protocol detection [16], and restricted our analysis to two encrypted protocols (SSL and SSH) and two unencrypted protocols (HTTP and SMTP).

For each packet, we store the source and destination ports, the HTTP message type, the HTTP message encoding, and the payload length; we also store coarse-grained statistics in the form of a binary value for each byte of the payload (indicating whether the byte's value is less than 128), and the byte-value frequencies for each n-byte block of the payload. The latter is needed to calculate sample entropy at the block level and for the frequency-based tests (e.g., $X^2$ and discrete K-S). In all cases, we only store information for the first 256 bytes of the payload.

We labeled each packet as 'opaque' or 'transparent' according to the expected data type for that packet: SSL and SSH packets are labeled opaque and SMTP packets are labeled transparent. For HTTP, we labeled packets based on the HTTP Content-Type and Content-Encoding header fields for the corresponding HTTP message. This allows us to further restrict our attention to only those packets for which we have reasonably accurate ground truth information. For instance, the HTTP 1.1 specification states that "HTTP entities with no specified Content-Type should be identified by inspection of the contents" [18]; we remove any such packets from our analysis because we have no way of determining ground truth. However, as we discovered during the course of this work, the HTTP content-type headers are often inaccurate and misleading in any case (see § 11 for more details).

Unfortunately, Bro suffers from performance problems (see [14]) on high-speed networks, especially when port-based analysis is disabled (as is necessary to force Bro to determine protocols by inspection). Therefore, we discard any HTTP packets which belong to flows in which Bro experienced losses. We do so because the dropped packet(s) could have contained essential labeling information (e.g., a message header) necessary for determining content-type and encoding information.

TABLE II

| Base Type | Sub-type | Action/Label |
| --- | --- | --- |
| image, video, audio | * | opaque |
| text | * | transparent |
| application | pdf, xml, flash | transparent |
| application | gzip, zip | opaque |
| application | * | drop |
| * | * | drop |

To label HTTP packets, we first examine the content encoding: if the strings 'gzip' or 'deflate' appear in the content-encoding, the packet is labeled opaque; otherwise, the label is determined by content type. HTTP content-type fields contain a base type, such as 'text' or 'video', a subtype, such as 'html' or 'mp4', and optional parameters, such as 'charset=us-ascii'. For our filtering, if the base type is 'image', 'video', or 'audio', the traffic is labeled opaque; if the base type is 'text', the traffic is labeled transparent. For the 'application' base type, subtypes 'zip' and 'xgzip' are considered opaque, while 'xml', 'pdf', and 'x-shockwave-flash' are considered transparent. While some of these subtypes (e.g., PDF) can be containers for many other formats, we choose to be conservative here and simply classify them as transparent since we have no clear cut way of drawing the line between semi-structured and more opaque formats. All others subtypes are dropped, since hand-labeling of all potential content types is infeasible and error-prone. Our HTTP filtering and labeling rules are summarized in Table II (given in order of application).

Figure 2:
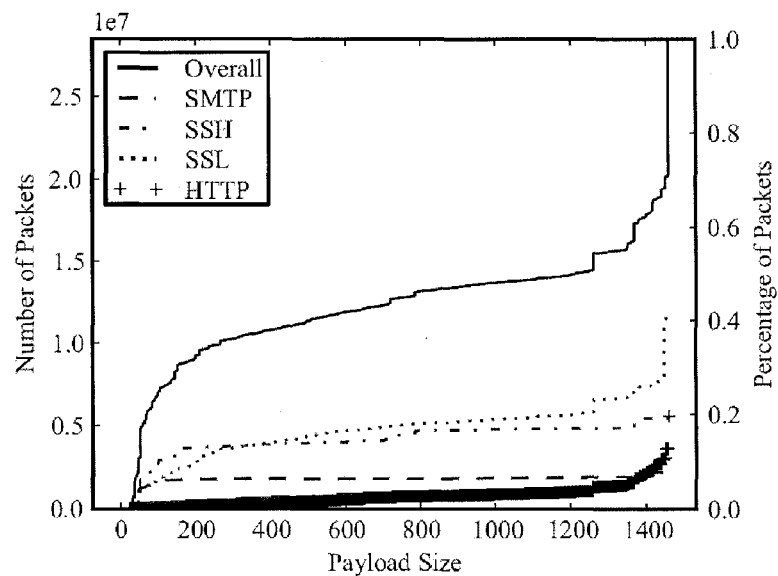
FIG. 2 is a diagram illustrating traffic makeup associated with two network traces.
Figure 2:
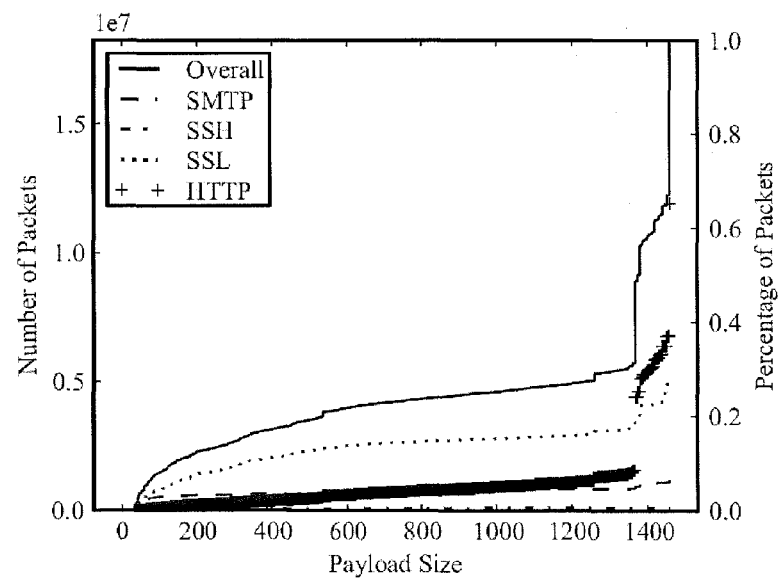

After filtering the traces down to only those packets which met the criteria outlined above, over 39 million packets (across≈3.8 million bi-directional flows) remained from trace1 and over 24 million (across≈2.3 million bi-directional flows) remained from trace2. The traffic makeup for both traces is shown in FIG. 2.

Figure 3:
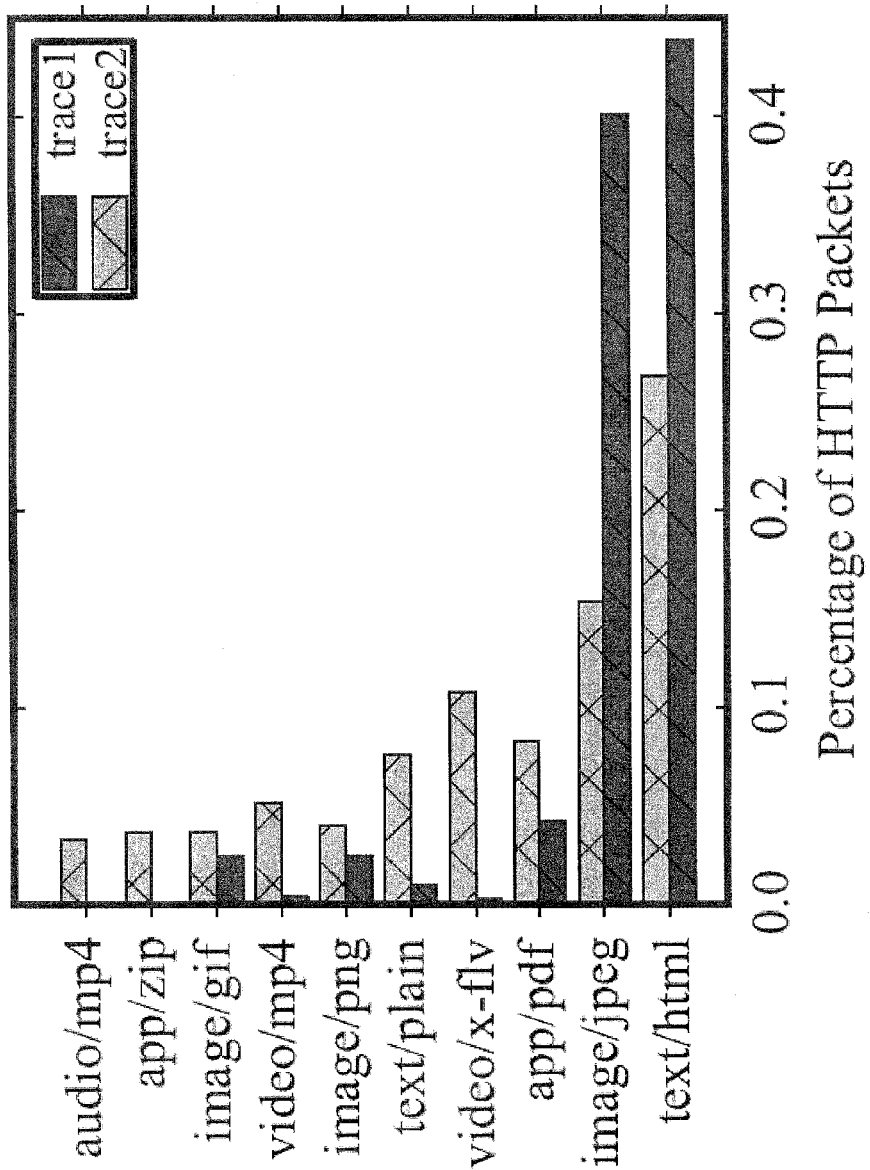
FIG. 3 is a diagram illustrating top content types of packets associated with two network traces.

The content-type distribution (FIG. 3) for the top content types in both traces reveals some interesting contrasts between the two traces. In particular, video types are prevalent in trace2 while trace1 consists mainly of web-browsing traffic (over 80% of trace1 HTTP packets have content type 'image/jpeg' or 'text/html', compared to 40% in trace2).

The content-encoding field is only specified for a small proportion of packets in our traces, and the only significant encoding is 'gzip,' at 4.0% in trace1 and 6.5% in trace2. All other encodings combined account for less than a tenth of a percent in each trace.

A. Offline Analysis

Parameter Space Exploration

In what follows, we provide several viewpoints on the performance of the detectors. First, we present ROC (receiver operating characteristic) plots that simultaneously examine the true positive rate and false positive rate as a parameter (e.g., a threshold) varies. A set of ROC plots, one for each classifier, can then be used to compare classifiers across a range of parameter values, allowing one to judge the relative performance of classifiers independent of particular parameter values.

We now present the results of a parameter space exploration experiment examining all of the hypothesis tests with varying parameter values. There are several knobs we can turn. For the sequential tests we explore the desired maximum false positive rate α, the desired maximum false negative rate β, and the maximum number of payload bytes N. The parameter values we examined for fixed tests included the desired significance level α and number of payload bytes N. In all experiments, the maximum number of samples for the sequential tests equals the sample size for the fixed tests.

We consider different alternative hypotheses by changing the relative weight, δ, of the lower 128 byte values versus the higher 128 byte values. δ is intended to model the relative prevalence of ASCII values in transparent traffic versus opaque traffic. The σ parameter takes values in (0:5; 1:0], and indicates the expected percentage of byte values less than 128. By changing the value, we alter our model of transparent traffic.

TABLE III

| Param. | Domain | |
|---|---|---|
| | Entropy | Bytevalue* |
| α | 0.001, 0.005, 0.01, 0.05 | (no addl.) |
| β† | 0.001, 0.005, 0.01, 0.05 | (no addl.) |
| δ‡ | 0.65, 0.75, 0.85 | (no addl.) |
| N | 8, 16, 24, 32, 48, 64, 80, 128 | 4, 12, 20, 28, 32, 40 |
| T | 0, 8, 16, 24 | 4, 12, 20 |

†Applicable only for sequential tests.
‡Not applicable for $\chi^2$ or discrete K-S tests.
*In addition to those for the entropy tests.

Figure 4:
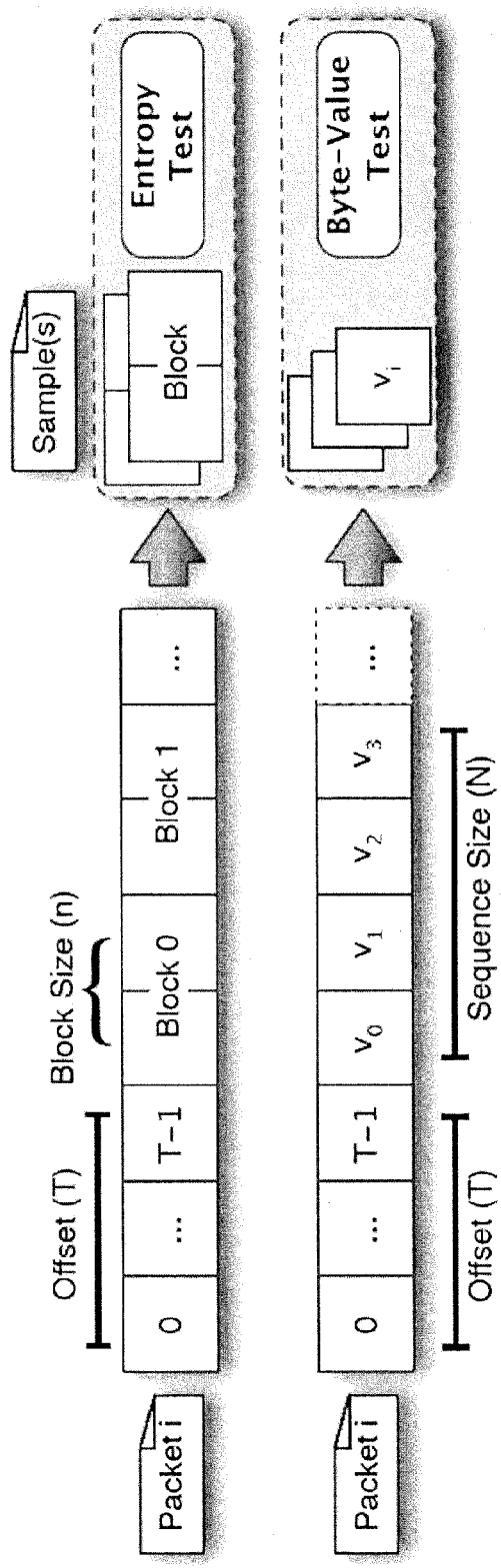
FIG. 4 is a diagram illustrating a byte offset for analyzing packets according to an embodiment of the subject matter described herein.

Finally, we explore starting our analysis at different points within the packet, represented by the offset value T (in bytes). As shown pictorially in FIG. 4, T indicates how many bytes into the payload, e.g., past the end of the TCP header, our analysis begins. The specific values explored for each parameter are given in Table III. Our dataset for the exploration experiment consists of the first 100,000 packets from trace1, and we consider only encrypted data as positive examples.

Figure 5:
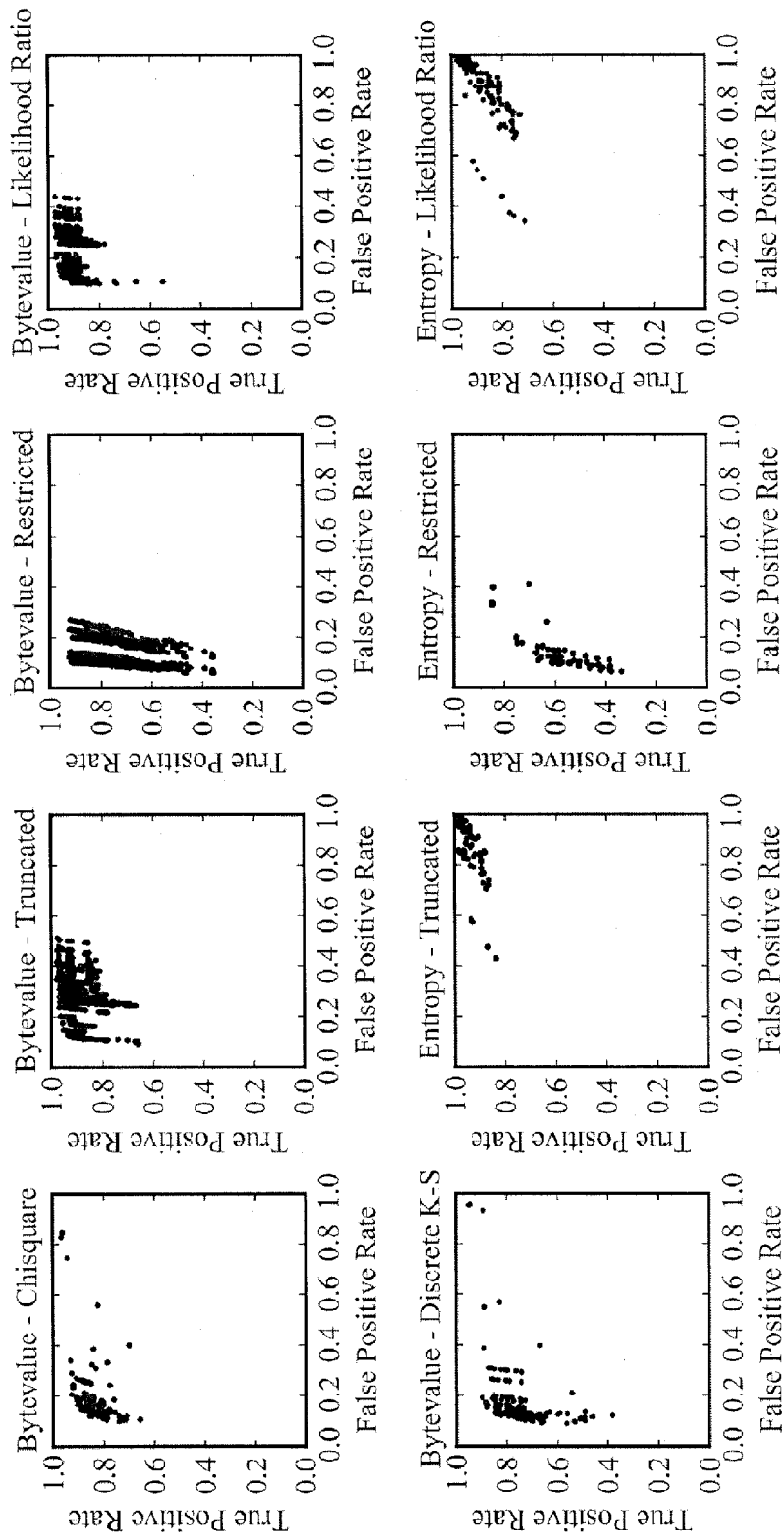
FIG. 5 is a diagram illustrating rates of packet mismatches associated with various tests for determining opaque data.

FIG. 5 shows a single point for each unique set of parameter values (over 10,000) in our experiments. Superior classifiers should evidence a high true positive rate and a low false positive rate, represented on a ROC plot by a predominance of points in the upper-left corner of the plot. Since the byte-value tests evidence the points closest to the upper-left corner, the plots indicate that the sequential tests and the likelihood-ratio test in the byte-value domain are able to more accurately classify packets than the other tests.

In order to examine the effects of specific parameter values on the efficacy of our techniques, we also make use of the so-called F-score, which is a weighted harmonic mean of the precision and recall metrics. Precision is defined as the ratio of the number of packets correctly classified as opaque, e.g., true positives, to the total number of packets classified as opaque. Recall is defined as the ratio of the number of true positives to the number of packets which are opaque according to our ground truth. Said another way, precision can be seen as measuring how often packets labeled as opaque are actually opaque (but says nothing about how often opaque packets are correctly identified), while recall indicates how often the method correctly identifies opaque packets (but says nothing about how often transparent packets are mislabeled).

We now examine each parameter in isolation by varying the parameter of interest while fixing the other parameters at default values (δ=0.85, α=β=0.005, N=32, and T=8). As might be expected, the number of bytes examined has a substantial effect on the performance of the detectors (FIG. 6(a)); this effect drops off over time, suggesting that less than 32 bytes are needed in the general case to make a decision and less than 16 bytes are needed by the truncated test in the byte-value domain. The byte-value tests are the clear winners; all three sequential methods and the likelihood-ratio method performed equally well, each attaining precision over 90%. The entropy tests performed unexpectedly poorly, in few cases obtaining scores close to those of the other tests. In addition, we found that the restricted entropy test did not behave as we expected with regard to increasing the number of samples involved; an investigation revealed no underlying patterns in labels of the misclassified examples. We suspect that the particular decision boundaries (all) used are simply poorly suited for the tests between entropy distributions.

With regard to changes in offset (FIG. 6(b)), we see no clear improvement in classification for offset values larger than 8 bytes. Changes to the desired false positive rate (FIG. 7(a)), similarly, have little impact on the performance of the detectors (the case for the false negative rate β is the same; we omit the figure for brevity). In either case, the parameters have little effect on the entropy tests (due to the small number of samples for the entropy tests, e.g., 4 samples at N=32 bytes); we therefore omit the entropy figures due to space constraints.

We also examine changes to the δ parameter, which controls the alternative hypothesis. Notice that in FIG. 7(b), the sequential tests appear to fail most often when the byte value distribution under $\mathcal{H}_1$ is assumed to be close to uniform; this is due to a large number of trials failing to make a decision, or forcibly making the wrong decision, when faced with too few samples to effectively choose between two similar distributions.

We can also compare these techniques based on their theoretical computational efficiency, in terms of the number of online floating-point operations required for each case. In the following, any operations which can be precomputed are omitted. In the byte-value domain, the sequential tests each require only a single multiplication and comparison per iteration, so the number of standard floating-point operations is no more than 2M for M samples (in the byte-value domain, samples are bytes, so M=N); the likelihood ratio test is the same, but with equality in the relation. Working in the entropy domain introduces the overhead both of binning the samples (M=N/n operations) and of computing the sample entropy (3k standard operations plus k logarithms). Pearson's $X^2$ test requires M operations to bin the samples and 3k operations, where k is the size of the domain (e.g., k=256 for the byte-value domain), to sum the squared difference between the observed count and expected count over all bins. Finally, the discrete K-S test is $O(M^2)$. From a performance standpoint, neither the K-S test nor the entropy tests are a good choice.

Summary of Findings

The above analysis leads to the observation that we can narrow the field of methods to the likelihood-ratio and sequential tests in the byte-value domain based on accuracy rates alone. Perhaps surprisingly, the entropy-based methods do not perform as accurately as those in the byte-value domain; we believe that this indicates that accurate entropy tests require more samples than are available in our context.

Content Type Matching

We performed a large-scale analysis on both trace1 and trace2; the overall results are given in Tables V and VI. Using the truncated sequential method (δ=0.85, α=β=0.005, N=16, and T=8), we achieve a match rate (e.g., the percentage of examples for which our techniques produced the same label as expected from the content type) of 95.1% on trace1, and 96.0% on trace2. We refer to 'match' rates here, rather than false-positive or false-negative rates, due to the large quantity of mislabeled content-types we encountered.

TABLE IV

| | trace1 | | trace2 | |
|---|---|---|---|---|
| Protocol | Match Rate | Examples | Match Rate | Examples |
| SSH | 94% | 7.3 m | 97% | 157k |
| SSL/TLS | 96% | 16.4 m | 94% | 5.5 m |
| SMTP | 86% | 3.35 m | 80% | 1.4 m |
| HTTP | 91% | 9.7 m | 85% | 13.8 m |
| Total | 94% | 36.7 m | 96% | 20.8 m |

Figure 6:
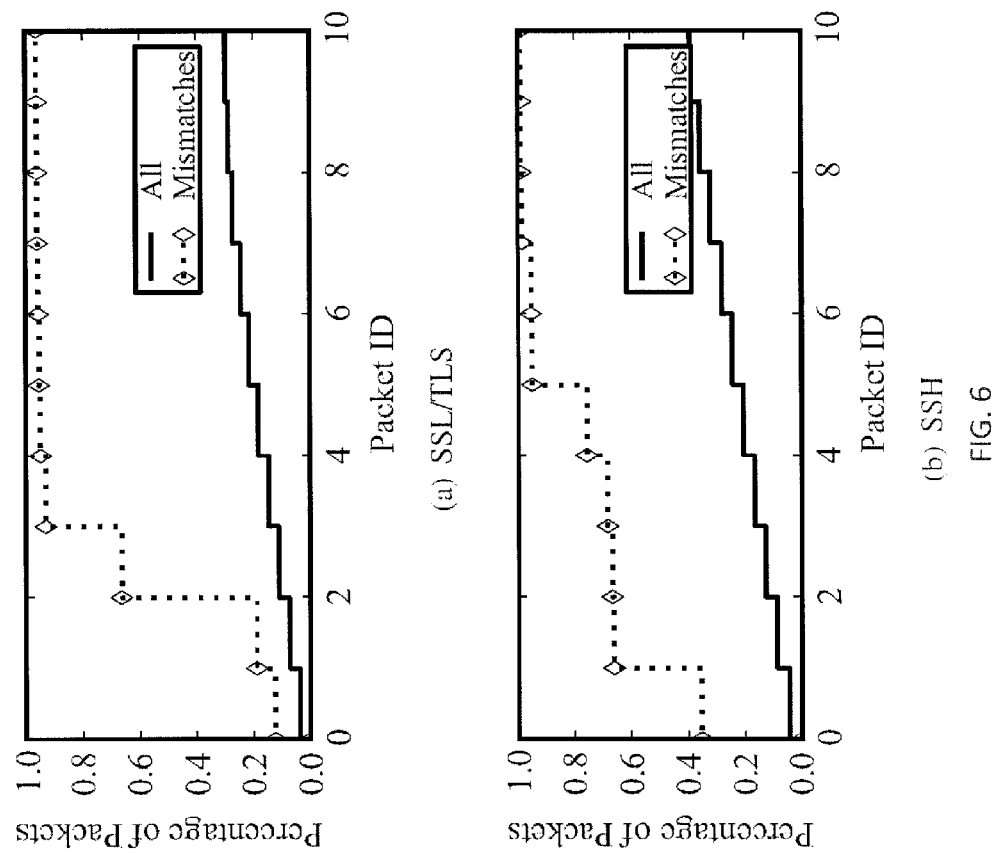
FIG. 6 is a diagram illustrating effects of changing byte offset on an analysis technique according to an embodiment of the subject matter described herein.
Figure 7:
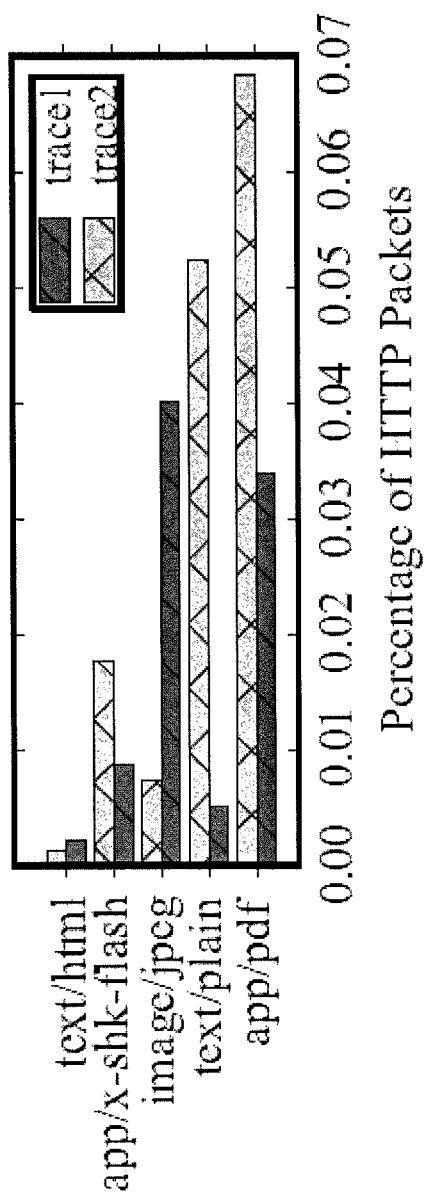
FIG. 7 is a diagram illustrating effects of a desired false positive rate on an analysis technique according to an embodiment of the subject matter described herein.

In the case of encrypted traffic (e.g., TLS/SSL) we accurately classified approximately 95% of the traffic. However, the mismatches are particularly interesting. FIG. 6 shows the distribution of packet IDs, where a packet's ID is its position in the bi-directional flow (e.g., a packet with ID zero is the first packet sent by the originator of the connection). Notice that 94.8% of mismatches for SSL/TLS occur within the first 5 packets, and 95% within the first 6 packets for SSH. These packets are all in the connection set-up phase and hence are not, in fact, encrypted. Moreover, these connection set-up packets, particularly any SSL certificates (typically around ID 2), may be of interest to DPI engines even when the encrypted payload is not.

A closer analysis of our overall results reveals that 50% of the transport-as-opaque mismatches for trace1, and 15% for trace2, are from SMTP traffic, which we surmise includes opaque attachments for which we do not have accurate labeling information. Of the HTTP transparent-as-opaque mismatches, many are PDF and Flash (both of which can serve as a container for many other object types), but a surprising proportion are of type text/plain.

Figure 8:
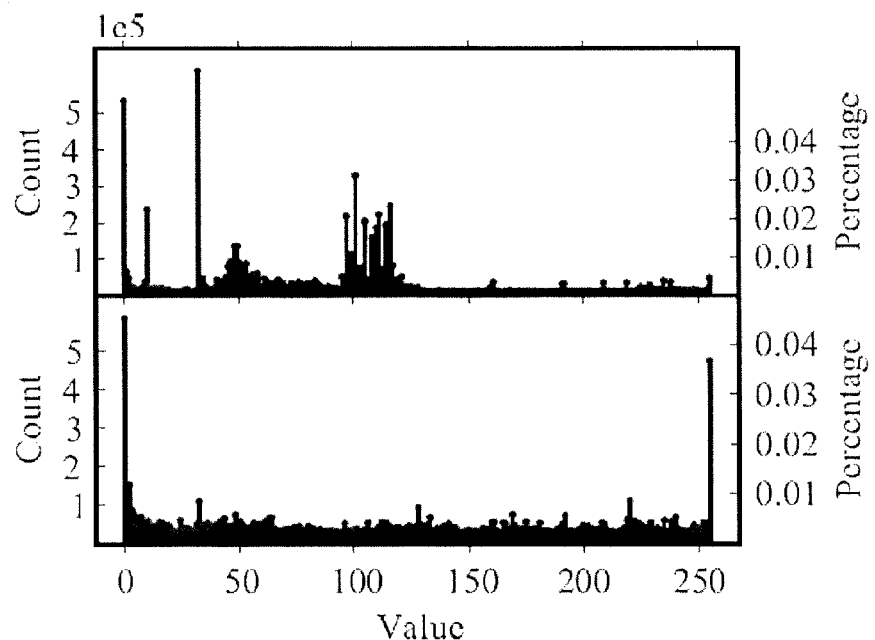
FIG. 8 is a diagram illustrating byte value distribution for various analyzed packets.
Figure 8:
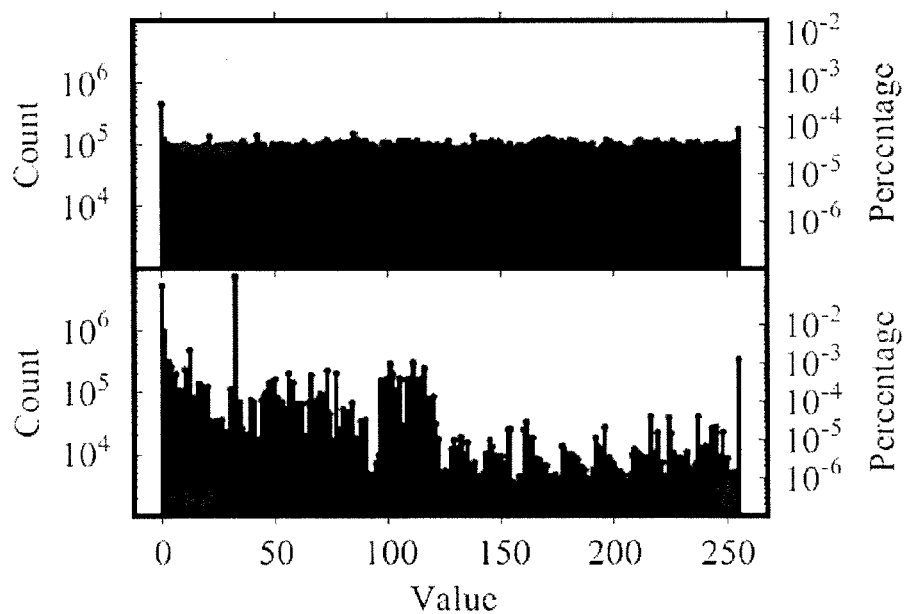

We investigated the text/plain mismatches from trace1 further and concluded, based on the observed byte-value distributions, that if these packets are in fact plaintext, the method used for encoding is non-standard. FIG. 8(a) depicts the byte value distribution for the mismatches and for the text/plain packets where the encoding was specified explicitly as one of UTF-8, UTF-16, US-ASCII or ISO-8859-1. As expected, the latter distribution has significant mass around the ASCII characters 'A'-'z' (values 65-122 in FIG. 8) while the former does not. A similar finding holds for the opaque-as-transparent mismatches in the image/jpeg case: the distribution (bottom, FIG. 8(b)) has striking similarities to that observed for the case of known plaintext encodings (top, FIG. 8(a)), and moreover, is quite different from that of the opaque JPEGs (top, FIG. 8(b)). Unfortunately, without access to actual payloads we cannot say what was the underlying cause for the peculiar distribution in the content flagged by our methods, but we believe this underscores the utility of our techniques—e.g., we successfully identified anomalous instances in both cases. We revisit this issue in the next section.

Finally, we examined the number of iterations needed by the truncated test to make a decision regarding each packet. With the maximum sample size set at 16 bytes, 45% of the packets can be classified in 12 bytes or less. Overall, we believe these results are very encouraging; we provide another perspective on the efficiency of our techniques in the next section.

Operator Analysis

We further explore the issue of Content-Type mismatches in a small experiment in which a resident network operator is able to manually inspect payload data from trace3. To enable this inspection, we instrumented a Bro IDS with the capability to save both HTTP entities and the payloads of TCP connections to disk. We then ran the instrumented Bro IDS against port 80 and port 443 traffic from a third trace (trace3), for which we were able to collect full payloads under the supervision of a local network operator. This trace covers four weekday afternoon hours of traffic at the department level of a major university, and consists of 27 million packets. We determined the opacity of each packet, saving those entities and connection payloads wherein the first five packets were mismatches. For the HTTP entities, we define a mismatch as having an opacity different from that implied by the Content-Type or Content-Encoding. For the stream on port 443, we consider transparent packets to be mismatches. In addition to the entities and connection payloads themselves, we also captured relevant metadata, such as the URI, Host, and MIME-type of the resulting file (determined using Bro's libmagic interface).

We discovered a number of mismatches on HTTP entities in the trace, of both the transparent-as-opaque and opaque-as-transparent varieties. In the former case, many of these mismatches were HTTP entities labeled with Content-Type 'text/plain' and no stated encoding; we determined from the metadata that most of these were either images or compressed bundles. These compressed bundles included what appear to be updates to Symantec antivirus (through symantecliveupdate.com), extensions to the Plex media center, and an installer for the DivX video codec (in the form of a Microsoft .cab file). The images were identified by MIME-type as JPEGs. One interesting mismatch declared a Content-Type of 'text/javascript', with no encoding, while the MIME-type reported was 'application/octet-stream'. Inspection of the filename (.gz) indicates that the file appears to be compressed.

Of the opaque-as-transparent mismatches, a number of entities were labeled as JPEG and GIF images by Content- and MIME-type but were flagged as transparent by our techniques. Many of these contain significant text, which we speculate may be metadata. We also found a large number of streams on port 443 with predominantly transparent packets. However, we were unable to inspect these streams due to constraints on time and the availability of the network operator.

File Type Identification

To further elucidate the issue of potential mismatches, we collected a set of files with known ground truth. We incorporated objects of various basic data types, including compressed archives and streams, encrypted files, executable binaries, and text files, into this set. We also attempted to cover different sub-types; for instance, we included five different text file encodings. The details of this set, which we believe to be a reasonable cross-section of common file types, are presented in Table V.

TABLE V

| Type | Objects | Size (MB) | % Opaque |
|---|---|---|---|
| compressed | 1410 | 40 | 97.8 |
| encrypted | 1410 | 91 | 98.9 |
| text | 5802 | 176 | 0.0 |
| images | 205 | 12 | 94.4 |
| executable | 498 | 43 | 65.5 |
| pdf | 1006 | 75 | 86.5 |

We gathered a base set of files from multiple sources, then applied standard compression and encryption algorithms to these files to create the remainder of the dataset. For executables, we used ELF binaries from the bin directories of a basic Ubuntu Server 10.04.3 installation (that we used for testing Bro and Snort IDSes). The files in each directory, including a number of perl scripts, were then individually compressed using tar to provide gzip and bz2 files and encrypted using openssl to provide examples of the RC4 and AES ciphers. The text files are the contents of the man path directory of the same Ubuntu installation, uncompressed and processed by groff into different encodings (ASCII, UTF-8, UTF-16, and UTF-32, and latin1); the PDF files are the archive of proceedings from a major computer security conference. Finally, the images were JPEGs scraped from public websites, including a departmental website and nasa-.gov.

To simulate a network environment, we transmitted each object over an individual TCP connection on the loopback device of an Ubuntu virtual machine. We used nc to both send and receive, and tcpdump to collect the resulting packets. We report the proportion of opaque and transparent packets observed for each type of file in Table V.

Our test labeled more than 95% of compressed, encrypted and image file packets as opaque, as expected. Similarly, even with four different encodings, our techniques labeled more than 99.99% of text file packets correctly as transparent. Our test is less consistent on the executables. Inspection of the binaries revealed a large number of null bytes, suggesting that a more targeted alternative hypothesis, perhaps counting only the set of printable ASCII bytes rather than simply those with value less than 128, may improve our results. However, this must be contrasted with the straightforwardness and efficiency of simply checking the high-order bit.

IDS Accuracy and Efficiency Improvements

To demonstrate the utility of winnowing opaque traffic in a real-world environment, we implemented some techniques as a preprocessor to a Snort IDS. Our preprocessor intercepts traffic before reaching the rule-matching engine, disabling any further processing on those packets deemed opaque.

Much of Snort's functionality, such as stream reassembly and HTTP inspection, is implemented as preprocessors which are executed after network and transport layer packet decoding but before engaging the rule-matching engine. Since the user specifies the order in which preprocessors are run, and earlier preprocessors can disable both later preprocessors and the matching engine on a per-packet basis, we positioned our winnowing preprocessor to intercept packets before reaching the stream reassembly module. This allows us to drop opaque packets early enough to avoid incurring the overhead (over 30% of Snort's run-time overhead in some experiments) of stream reassembly and long before reaching the pattern matching engine.

To evaluate the preprocessor's effectiveness, we performed a series of both online and offline tests. We used two different rulesets in these experiments: one provided by a major university, which uses Snort primarily for post-facto forensics, and a second, compiled by the authors, consisting of the Snort 2.9.1.2 rules plus the Emerging Threats 2.9.0 rules. To focus the ruleset on exploit detection (rather than policy enforcement), and to avoid large numbers of spurious alerts, we disabled the benign 'policy', 'file-type identification', 'info', 'p2p', 'game', and 'chat' rules, three shellcodedetection rules notorious for false-positives, and one rule which required specification of authorized SMTP servers. In total, the university ruleset contains 1606 rules, and the custom ruleset 9302.

To show how our winnowing technique does not discard a significant number of packets which would otherwise cause alerts, we ran Snort with winnowing under each ruleset on a full-payload trace (to ensure no packet losses). The trace used is the publicly available MITLL/DARPA 1999 intrusion detection data set. The university ruleset produced no alerts on the DARPA data set; our custom ruleset produced the same 4728 alerts on that data set, both with winnowing enabled and without.

To verify our claim that opaque packets require more processing time than transparent packets, we ran the above experiment on the DARPA dataset 10 times. We inspected only port 80 (HTTP) traffic and found a reduction in the average per-packet time, when comparing stock Snort to Snort with winnowing, of 30% (with a standard deviation 1%) with the university ruleset and 21% (with a standard deviation 0.6%) with the custom ruleset. Of the 30 million TCP packets in the DARPA dataset, 11.9 million contained TCP payloads, of which we flagged 3.2 million as opaque (27.1%).

Online Analysis

We made use of a Data Acquisition and Generation (DAG) card to run two Snort instances in parallel, one with stock Snort and the other with winnowing enabled, on live traffic. The DAG uses a packet processor to capture and timestamp packets at line rate, and employs an on-board direct memory access (DMA) engine to zero copy packets into the host's memory. The DMA engine can also be programmed to duplicate traffic over multiple memory buffers (called "streams"), which enables us to simultaneously run multiple experiments, thereby comparing different approaches on the same traffic. We use a 10 Gbps DAG connected to a 2.53 gigahertz (Ghz) Intel Xeon 6 core host with 16 GB of memory.

We also take advantage of the fact that the DAG provides a programmable FPGA and TCAM (Ternary Content Addressable Memory) for filtering packets. Our TCAM has a width of 389 bits and can simultaneously compare 14 packet header fields (Ethernet through Layer-4). Packets which pass policy requirements (e.g., TCP traffic on port 80) are redirected to the host. Since the filtering can be done on the DAG, CPU resources are used exclusively for payload inspection.

As in our earlier experiments, we only examined traffic on ports 22, 25, 80, and 443. There were no differences between the two configurations beyond the winnowing preprocessor. Both used the university ruleset and the default Snort options (including inspection of gzipped HTTP entities and the bypassing of the detection algorithms by SSL application data packets in established streams), and each was allocated 2 GB of memory on the DAG.

Figure 9:
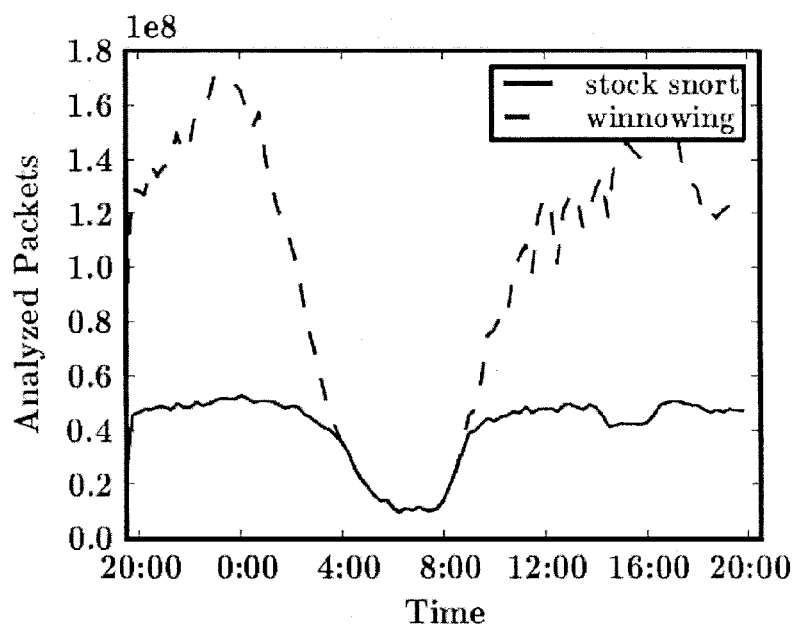
FIG. 9 is a diagram illustrating a number of packets analyzed and alarms generated based on the packets.
Figure 9:
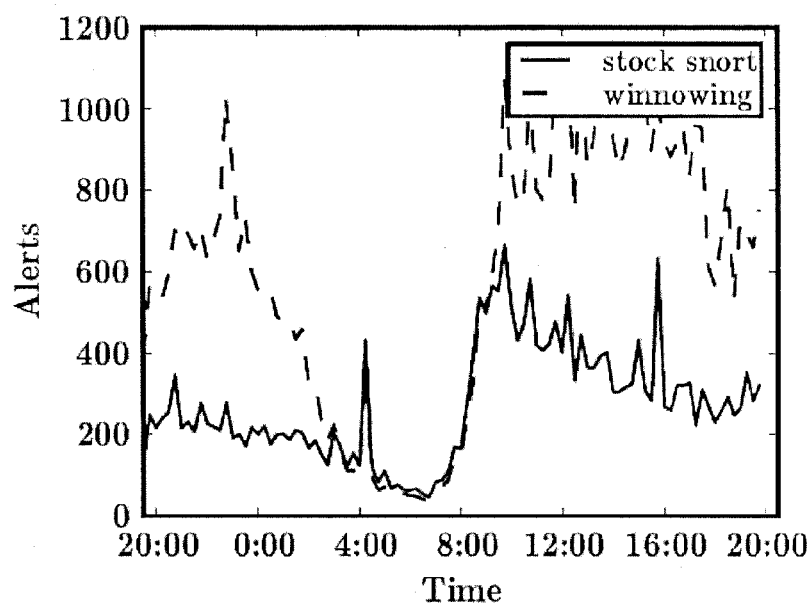

Our primary experiment lasted for 24 hours and encompassed more than 7.6 terabytes of traffic; the load reached 1.2 Gbps at peak. FIG. 9(a) shows the number of packets which each instance of Snort was able to process in 15-minute intervals. Even at peak load, our winnowing Snort instance is able to handle the full volume with zero percent packet loss. In contrast, the stock Snort instance dropped nearly 60% of the 98.9 billion packets observed during the 24-hour window. In fact, the winnowing Snort instance processed 147% more packets, resulted in over 33,000 additional alerts (see FIG. 9(b)) on traffic which would have otherwise been dropped due to overload.

Figure 10:
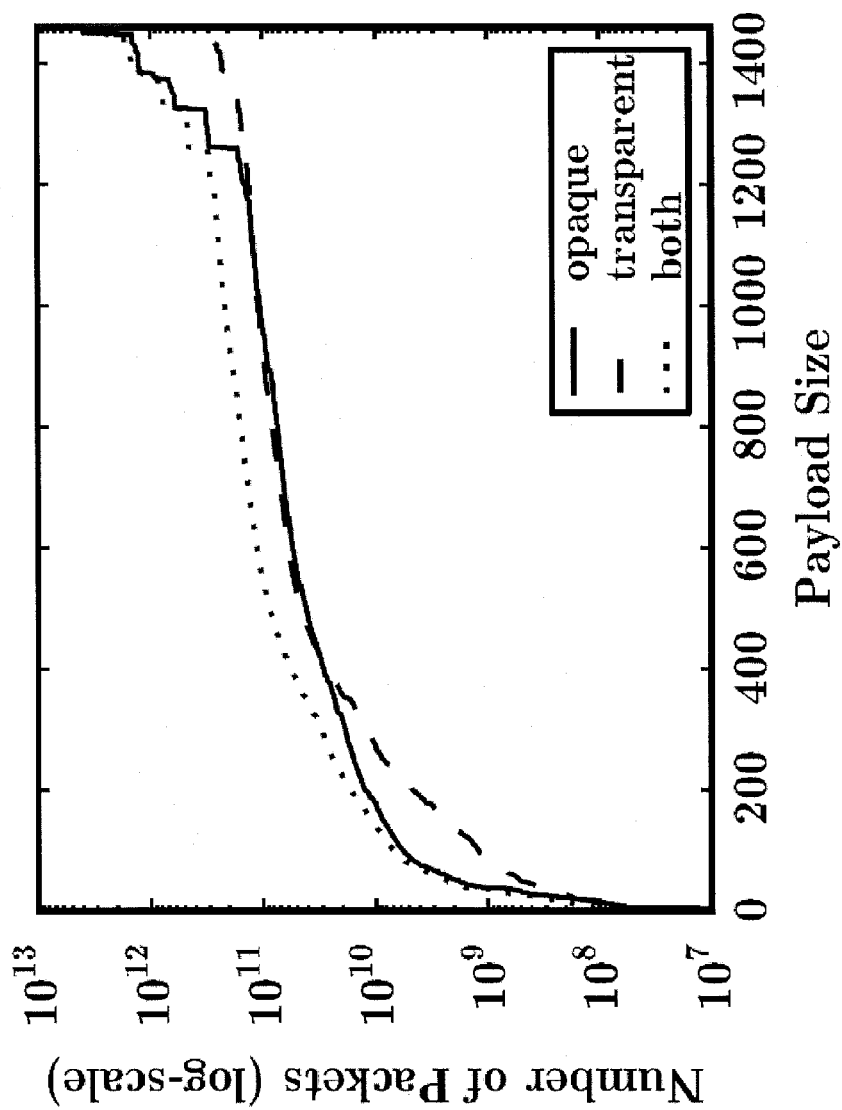
FIG. 10 is a diagram illustrating differences in packet size distributions of analyzed packets.

The substantial improvement in capacity arises due to the surprisingly high proportion of opaque traffic. In total, 89% of the payload-carrying TCP packets observed were classified as opaque, representing 86% of the bytes transmitted. We hypothesize that this is due to the prevalence of streaming video services such as Hulu, Netflix, and YouTube operating on port 80. Differences in the packet size distributions (see FIG. 10) indicate that MTU-sized packets are far more often opaque than not, which suggests that large, compressed streams (e.g., the aforementioned streaming video), are prevalent.

Implications: Since winnowing opaque packets fundamentally changes the mix of traffic which reaches the rules-matching engine in an IDS, its influence could lead to deeper insights about network activities. To evaluate this further, we compared the alerts generated by both instances of Snort. In total, the stock Snort instance generated 25,081 alerts, while the Snort instance augmented with winnowing produced 58,297 alerts—a 118% increase. Of these, the three most prevalent in both cases remained the same; two overflow attack detections and a file-type identification alert (for portable executable binaries). We found the differences between the distributions of rules triggered by the stock Snort and by Snort with winnowing to be particularly interesting. One PowerPoint administrator privilege escalation attack rule was triggered 2000% more times by the winnowing Snort instance, an almost 10-fold increase over what one might expect just from the increased traffic volume. We also found a 760% increase in alerts for PDFs with embedded JavaScript. The only class of rules which produced fewer alerts when winnowing opaque traffic were for HTTP connections to blacklisted domains. Since HTTP headers are in plaintext, and hence not dropped by Winnow, we suspect that the missed alerts are due to Snort failing to recover from missing (opaque) packets in a stream. Since parsing of HTTP headers is possible even in the presence of missing payload packets, we believe such alerts would be triggered if the IDS was better designed to recover from such midstream losses.

Finally, we observed an 84% reduction in the average per-packet time over the period of the experiment, further evidence that opaque packets require more computational resources to process than transparent packets.

III. Related Work

The related problem of forensic file and data type identification has been extensively explored over the past decade. Many of these efforts have focused on analyses of byte frequency distributions, i.e., the frequency of each byte value in the data of interest. For the most part, these approaches work by creating signatures for known file types (i.e., HTML or PDF) based on byte frequency distributions, and then comparing unknown files to pre-existing signatures to determine the file type [1-3, 6, 16, 17, 25, 26, 28, 32-34, 40, 48]. Veenman [48] and Hall [21] examined entropy and compressibility measurements as indicators of file type, while others have explored techniques for directly modeling the structure of files [20, 22, 27, 41]. Conti et al. [10] considered distinguishing between random, encrypted and compressed files using k-nearest-neighbor classification. Shannon entropy and the $X^2$ statistic, amongst other measures, are evaluated as distance metrics over sliding windows of 1 KB or more. Similar ideas were explored by Shamir and Someren [42] for identifying cryptographic keys on disk. However, as our empirical analyses showed, the forensics scenario is fundamentally distinct from the setting we explore in this work: for real-time analysis on the network, the amount of data available per object examined is constrained and computational resources are scarce.

Approaches based on byte-frequency [52, 54] and entropy [29, 44, 45, 53] have also been applied in the context of malware identification and analysis, both on disk and in network traffic. These approaches are not well suited for our task, as either they require large sample sizes for their statistical tests to be valid and/or impose high computational costs.

Olivain and Goubault-Larrecq uses hypothesis testing of the sample entropy statistic to determine whether packets are encrypted [35]. Similarly, Dorfinger proposed an approach for detecting encrypted traffic using entropy estimation, intended as a prefiltering step for a Skype flow detection engine [4, 11-13, 47]. Their encryption detection scheme shares much in common with that of Olivain and Goubault-Larrecq, and is based on calculating the sample entropy for the packet payload and comparing that entropy value to the expected entropy value for a sequence of uniformly randomly distributed bytes of the same length. However, their entropy estimation approach does not scale well to situations where the number of samples is small [36-38]. For our entropy-based tests, we addressed this issue head on by calculating the exact probability distribution function (see § I and § A) for the (byte-) entropy of n bytes, for small n. Malhotra compared a number of standard statistical tests, including the $X^2$ and Kolmogorov-Smirnov tests, for identifying encrypted traffic [30]. As with Olivain and Goubault-Larrecq, their approaches required at least 1 KB of data per trial. Nonetheless, byte-value tests described herein outperformed all of these approaches.

From a systems perspective, similar notions have been suggested in the context of improving the ability of NIDS to weather inevitable traffic spikes by the selective discarding [39] of packets when the system is under load. Papadogiannakis et al. propose discarding packets from lengthy flows, reasoning that these packets are less likely to trigger alerts. We believe our approach is more general, both in that we enable new policy decisions, as discussed earlier, and techniques described herein can operate on flows of any length. Hence, techniques described herein may be employed in a load-dependent fashion, but we focus on the more difficult load-independent setting in order to explore the limits of said techniques.

Jung et al. [24] applied hypothesis testing to PortScan detection, and Jaber and Barakat [23] proposed an iterative approach that used the size and direction of each packet to determine the most likely application generating the observed traffic.

IV. Discussion & Future Work

At first blush, it may appear that binary protocols present an insurmountable problem for methodology or techniques described herein. However, we point out that the majority of traffic—80% on our network—is HTTP, a text protocol. Furthermore, the high-volume binary protocols (SSL, RTMP, and Bittorrent) transport primarily, if not exclusively, opaque data. Finally, we suggest that a different alternative hypothesis, such as that mentioned earlier in the context of identifying file types, will likely provide improved accuracy for binary protocols.

Additionally, while it may seem that the flow level, as opposed to the packet-level, is the natural vantage point for identifying opaque traffic, our work concentrates on packet-level analysis. We argue that the presence of tunneled traffic, and container formats such as PDF, mandates identification of opaque traffic on a per-packet basis. In the specific case of encrypted connections, many protocols (e.g., SSH and SSL) begin with unencrypted, connection set-up packets; some protocols (e.g., STARTTLS) are even designed specifically to enable upgrading a connection from unencrypted to encrypted mid-stream. Furthermore, packet-level techniques can be used in situations where flow state is not kept, such as on DAG cards. Finally, by performing packet-level analysis, we can winnow opaque packets before they reach the stream reassembly engine, significantly reducing overhead. Nevertheless, there are benefits to incorporating some flow-level analysis, such as increasing the ability to mitigate packet-level misclassifications by utilizing information from prior and subsequent packets.

Further Thoughts

As disclosed herein, we propose the notion of quick and accurate winnowing of opaque traffic as a mechanism for reducing the demands upon DPI engines, and introduce a number of statistical techniques for performing such winnowing. Our techniques are compared against other possible approaches, and through extensive evaluation, we show that our statistical approaches perform best. Our results demonstrate that we are able to identify opaque data with 95% accuracy, despite significant mislabeling of HTTP Content-Types on the network. By implementing our approach with the Snort IDS, we demonstrate that winnowing vastly improves the rate at which an IDS can process packets without adversely impacting accuracy. Our experiments show that winnowing enables Snort to process 147% more packets and generate 135% more alerts over a 24-hour collection period featuring a peak traffic volume of 1.2 Gbps.

Our experiments also indicate that the vast majority—89% of payload-carrying TCP packets on our network—of modern network traffic is opaque. We believe this result may have far reaching consequences in its own right, and highlights the importance of developing methods specific to processing opaque data at line rates.

Techniques presented herein may be utilized to provide fast and accurate classification of traffic into broad classes, such as encrypted, compressed, and plaintext. Further, the ability to classify traffic in this way may provide significant benefits by enabling second-line (e.g., DPI) analysis engines to target each class with specialized approaches, rather than attempting to apply heavy-weight analyses to a general mix of traffic.

REFERENCES

[1] I. Ahmed, K.-S. Lhee, H. Shin, and M. Hong. On improving the accuracy and performance of content-based file type identification. In Proceedings of the Australasian Conference on Information Security and Privacy, pages 44-59, 2009.
[2] I. Ahmed, K.-s. Lhee, H. Shin, and M. Hong. Fast filetype identification. In Proceedings of the Symposium on Applied Computing, pages 1601-1602, 2010.
[3] M. C. Amirani, M. Toorani, and A. A. B. Shirazi. A new approach to content-based file type detection. In Proceedings of the 13th IEEE Symposium on Computers and Communications, pages 1103-1108, 2008.
[4] D. Bonfiglio, M. Mellia, M. Meo, D. Rossi, and P. Tofanelli. Revealing Skype traffic: when randomness plays with you. Comp. Commun. Review, pages 37-48, 2007.
[5] J. J. Bussgang and M. B. Marcus. Truncated sequential hypothesis tests. IEEE Transactions on Information Theory, 13(3), July 1967.
[6] W. C. Calhoun and D. Coles. Predicting the types of file fragments. Digital Investigation, 5(Supplement 1):S14-S20, 2008.
[7] N. Cascarano, A. Este, F. Gringoli, F. Risso, and L. Salgarelli. An experimental evaluation of the computational cost of a DPI traffic classifier. In Global Telecommunications Conference, pages 1-8, 2009.
[8] K. Chiang and L. Lloyd. A case study of the Rustock rootkit and spam bot. In Proceedings of the First Workshop on Hot Topics in Understanding Botnets, 2007.
[9] W. J. Conover. A Kolmogorov goodness-of-fit test for discontinuous distributions. Journal of the American Statistical Association, 67:591-596, 1972.
[10] G. Conti, S. Bratus, A. Shubina, B. Sangster, R. Ragsdale, M. Supan, A. Lichtenberg, and R. Perez-Alemany. Automated mapping of large binary objects using primitive fragment type classification. Digital Investigation, 7(Supplement 1):S3-S12, 2010.
[11] P. Dorfinger. Real-time detection of encrypted traffic based on entropy estimation. Master's thesis, Salzburg University of Applied Sciences, 2010.
[12] P. Dorfinger, G. Panholzer, B. Trammell, and T. Pepe. Entropy-based traffic filtering to support real-time Skype detection. In Proceedings of the 6th International Wireless Communications and Mobile Computing Conference, pages 747-751, 2010.
[13] P. Dorfinger, G. Panholzer, and W. John. Entropy estimation for real-time encrypted traffic identification. In Traffic Monitoring and Analysis, volume 6613 of Lecture Notes in Computer Science. 2011.
[14] H. Dreger, A. Feldmann, V. Paxson, and R. Sommer. Operational experiences with high-volume network intrusion detection. In Proceedings of the 11th ACM conference on Computer and Communications Security, 2004.
[15] H. Dreger, A. Feldmann, M. Mai, V. Paxson, and R. Sommer. Dynamic application-layer protocol analysis for network intrusion detection. In Proceedings of the 15th USENIX Security Symposium, 2006.
[16] J. Dunham, M.-T. Sun, and J. Tseng. Classifying file type of stream ciphers in depth using neural networks. ACS/IEEE International Conference on Computer Systems and Applications, 2005.
[17] R. F. Erbacher and J. Mulholland. Identification and localization of data types within large-scale file systems. In Proceedings of the Second International Workshop on Systematic Approaches to Digital Forensic Engineering, pages 55-70, April 2007.
[18] R. Fielding, J. Gettys, J. Mogul, H. Frystyk, L. Masinter, P. Leach, and T. Berners-Lee. RFC 2616, Hypertext Transfer Protocol—HTTP/1.1, 1999.
[19] Z. Govindarajulu. Sequential Statistics. World Scientific Publishing, Singapore, 2004.
[20] J. Haggerty and M. Taylor. Forsigs: Forensic signature analysis of the hard drive for multimedia file fingerprints. In Proceedings of IFIP International Information Security Conference, 2006.
[21] G. A. Hall. Sliding window measurement for file type identification. ManTech Security and Mission Assurance, 2006.
[22] R. M. Harris. Using artificial neural networks for forensic file type identification. Master's thesis, Purdue University, 2007.
[23] M. Jaber and C. Barakat. Enhancing application identification by means of sequential testing. In Proceedings of the 8th International IFIP-TC 6 Networking Conference, 2009.
[24] J. Jung, V. Paxson, A. Berger, and H. Balakrishnan. Fast portscan detection using sequential hypothesis testing. In IEEE Symposium on Security and Privacy, pages 211-225, may 2004.
[25] M. Karresand and N. Shahmehri. File type identification of data fragments by their binary structure. In Proceedings of the IEEE Information Assurance Workshop, pages 140-147, June 2006.
[26] M. Karresand and N. Shahmehri. Oscar: File type identification of binary data in disk clusters and ram pages. In Proceedings of the IFIP International Security Conference: Security and Privacy in Dynamic Environments, pages 413-424. Springer, 2006.

[27] B. Li, Q. Wang, and J. Luo. Forensic analysis of document fragment based on SVM. In International Conference on Intelligent Information Hiding and Multimedia Signal Processing, December 2006.

[28] W.-J. Li, K. Wang, S. Stolfo, and B. Herzog. Fileprints: identifying file types by n-gram analysis. In Proceedings of the IEEE Information Assurance Workshop, June 2005.

[29] R. Lyda and J. Hamrock. Using entropy analysis to find encrypted and packed malware. IEEE Security and Privacy, 5:40-45, March 2007.

[30] P. Malhotra. Detection of encrypted streams for egress monitoring. Master's thesis, Iowa State University, 2007.

[31] U. Maurer. A universal statistical test for random bit generators. Journal of Cryptology, 5:89-105, 1992.

[32] M. McDaniel. Automatic file type detection algorithm. Master's thesis, James Madison University, 2001.

[33] M. McDaniel and M. H. Heydari. Content based file type detection algorithms. In Proceedings of the Hawaii International Conference on System Sciences, January 2003.

[34] S. Moody and R. Erbacher. Sadi—statistical analysis for data type identification. In Proceedings of the Third International Workshop on Systematic Approaches to Digital Forensic Engineering, pages 41-54, May 2008.

[35] J. Olivain and J. Goubault-Larrecq. Detecting subverted cryptographic protocols by entropy checking. Research Report LSV-06-13, Laboratoire Spécification et Vérification, ENS Cachan, France, June 2006.

[36] L. Paninski. Estimation of entropy and mutual information. Neural Computation, 15(6):1191-1253, 2003.

[37] L. Paninski. Estimating entropy on m bins given fewer than m samples. IEEE Transactions on Information Theory, 50(9):2200-2203, 2004.

[38] L. Paninski and M. Yajima. Undersmoothed kernel entropy estimators. IEEE Transactions on Information Theory, 54(9):4384-4388, 2008.

[39] A. Papadogiannakis, M. Polychronakis, and E. P. Markatos. Improving the accuracy of network intrusion detection systems under load using selective packet discarding. In Proceedings of the Third European Workshop on System Security, EUROSEC, 2010.

[40] P. Phunchongharn, S. Pornnapa, and T. Achalakul. File type classification for adaptive object file system. In Proceedings of the IEEE Region 10 Technical Conference, pages 1-4, November 2006.

[41] V. Roussev and S. L. Garfinkel. File fragment classification—the case for specialized approaches. IEEE International Workshop on Systematic Approaches to Digital Forensic Engineering, pages 3-14, 2009.

[42] A. Shamir and N. v. Someren. Playing "hide and seek" with stored keys. In Proceedings of the Third International Conference on Financial Cryptography, pages 118-124, 1999.

[43] R. Sommer. Viable Network Intrusion Detection in High-Performance Environments. Doktorarbeit, Technische Universität München, Munich, Germany, 2005.

[44] S. J. Stolfo, K. Wang, and W. jen Li. Fileprint analysis for malware detection. Technical report, Columbia University, 2005.

[45] S. M. Tabish, M. Z. Shafiq, and M. Farooq. Malware detection using statistical analysis of byte-level file content. In KDD Workshop on CyberSecurity and Intelligence Informatics, pages 23-31, 2009.

[46] K. Thomas and D. Nicol. The koobface botnet and the rise of social malware. In Malicious and Unwanted Software (MALWARE), pages 63-70, October 2010.

[47] B. Trammell, E. Boschi, G. Procissi, C. Callegari, P. Dorfinger, and D. Schatzmann. Identifying Skype traffic in a large-scale flow data repository. In Traffic Monitoring and Analysis, volume 6613 of Lecture Notes in Computer Science, pages 72-85. 2011.

[48] C. J. Veenman. Statistical disk cluster classification for file carving. In Proceedings of the Third International Symposium on Information Assurance and Security, pages 393-398, 2007.

[49] D. D. Wackerly, W. M. III, and R. L. Scheaffer. Mathematical Statistics with Applications. Duxbury Press, Pacific Grove, Calif., sixth edition, 2002.

[50] A. Wald. Sequential tests of statistical hypotheses. The Annals of Mathematical Statistics, 16(2):117-186, June 1945.

[51] A. Wald and J. Wolfowitz. Optimum character of the sequential probability ratio test. Annals of Mathematical Statistics, 19(3):326-339, 1948.

[52] K. Wang and S. J. Stolfo. Anomalous payload-based network intrusion detection. In Recent Advances in Intrusion Detection, pages 203-222, 2004.

[53] M. Weber, M. Schmid, D. Geyer, and M. Schatz. Peat—a toolkit for detecting and analyzing malicious software. In Proceedings of the 18th Annual Computer Security Applications Conference, pages 423-431, 2002.

[54] L. Zhang and G. B. White. An approach to detect executable content for anomaly based network intrusion detection. In IEEE International Parallel and Distributed Processing Symposium, pages 1-8, 2007.

The disclosures of the above-mentioned references [1]-[54] are incorporated herein by reference in their entireties.

The foregoing description is for the purpose of illustration only, and not for the purpose of limitation, as the subject matter described herein is defined by the claims.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 11:
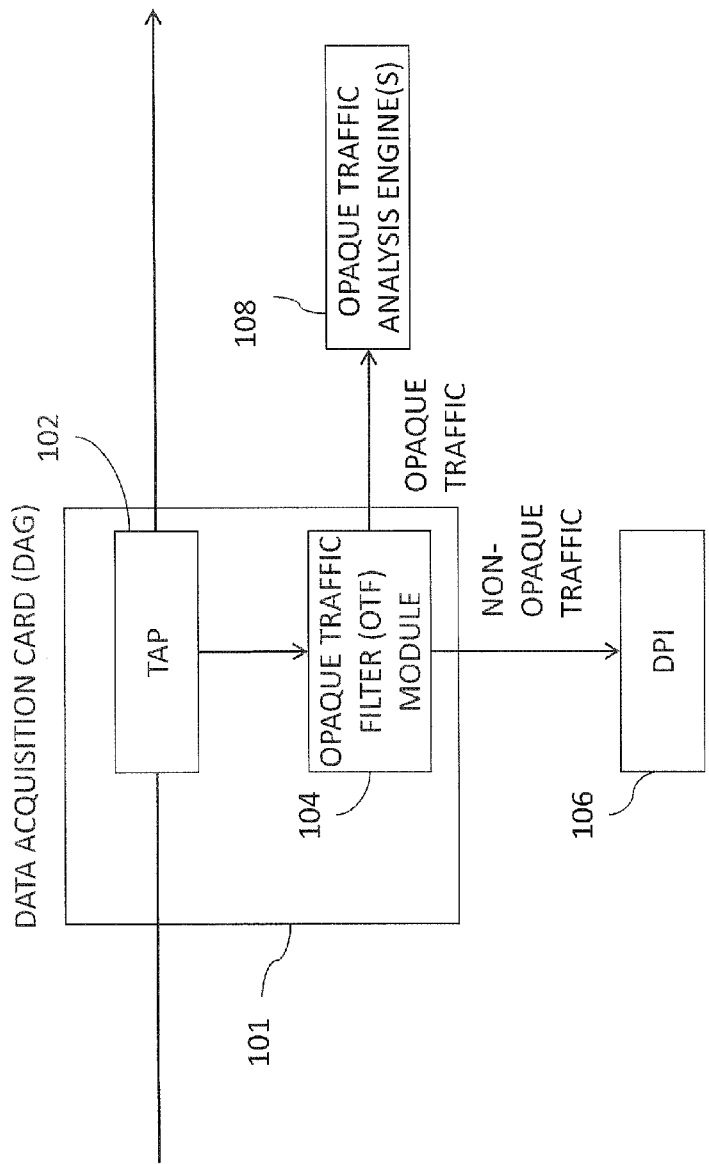
FIG. 11 is a diagram illustrating an exemplary module for rapid filtering of opaque data traffic according to an embodiment of the subject matter described herein.

FIG. 11 is a diagram illustrating an exemplary module for performing opaque traffic filtering according to an embodiment of the subject matter described herein. Referring to FIG. 11, a tap 102 and an opaque traffic filter (OTF) module 104 are depicted. In some embodiments, a DAG 101 may include OTF module 104 and/or tap 102.

Tap 102 may be any suitable entity (e.g., a communications interface) for receiving, intercepting, observing, and/or copying messages. For example, tap 102 may be associated with a link or node. Tap 102 may observe and copy packets that traverse the link or node.

OTF module 104 may be any suitable entity (e.g., software executing on a DAG) for providing one or more aspects of detecting, processing, and/or filtering packets or flows. For example, OTF module 104 may receive packets and determine, using one or more techniques described herein or portions thereof, whether the packet contains opaque (e.g., compressed or encrypted) data. OTF module 104 may be configured to use various techniques (e.g., entropy-based tests, sequential and fixed sample-size statistical hypothesis tests, etc.) in determining whether a packet contains opaque data. In another example, OTF module 104 may receive packets and perform statistical fingerprinting (e.g., one or more techniques for identifying protocols and/or other characteristics) on one or more packets.

In some embodiments, determining whether a packet contains opaque data may include determining whether a payload of a packet contains random or seemingly random data. For example, OTF module 104 may analyze a portion of a payload for determining bit, byte or block (e.g., one or more bytes) data frequency distributions. Data frequency distributions may indicate the frequency of bit, byte or block values within a particular (e.g., analyzed) data portion.

In some embodiments, uniformly distributed bit, byte or block values (e.g., where the frequency or likelihood of a bit, byte or block having a certain value is the same or about the same as other possible values) may be indicative of opaque data. For example, OTF module 104 may analyze the payload data, or a portion of the payload data, of a packet. Using one or more techniques (e.g., entropy-based tests or statistical hypothesis-based tests), OTF module 104 may analyze the data and determine whether data is distributed in a uniform or random manner.

OTF module 104 may be configured to perform one or more techniques for determining whether a packet contains opaque data. Some techniques may include analyzing bit value distribution, byte value distribution, or sample entropy distribution of a payload portion of a packet for determining whether the payload portion includes uniformly distributed bit, byte or block values. For example, the sample entropy may be the (byte-) entropy of a block of bytes, where the number of bytes n in a block is parameterized. In other words, if X is a random variable in the entropy domain, then the support of X may be the set of all possible values for the byte-entropy of n bytes.

OTF module 104 may be configured to perform a fixed sample-size likelihood ratio test and/or other fixed sample-size hypothesis tests.

OTF module 104 may be configured to perform a sequential probability ratio test and/or other sequential hypothesis tests. For example, sequential testing generally works by examining samples (e.g., data) one-by-one, and evaluating a decision function (e.g., opaque data, transparent data, or continue testing) at each sample. Generally, sequential testing stops after enough "evidence" is collected for a decision.

In some embodiments, a sequential hypothesis test may use one or more parameters (e.g., false positive value, a false negative value, and/or an equal error rate value) when testing some sequence of samples (e.g., bytes in a payload portion) for a hypothesis (e.g., packet contains opaque data) to determine some threshold value(s). If after testing a first sample, the threshold value is exceeded, a decision can be made and the test can end. However, if the threshold is not exceeded, testing may continue until the threshold is reached or a certain number of samples have been examined.

In some embodiments, other tests and/or functions may be used to determine whether packet contains opaque data. For example, if a sequential probability ratio test reaches a certain threshold (e.g., 8 samples or bytes) without a decision being reached, a fixed-size likelihood test may be applied to the samples examined thus far. In another example, a function may be used to determine a particular threshold for each distinct number of samples, e.g., sloping decision boundaries so as to force a decision within a certain number of samples.

OTF module 104 may be configured to perform entropy-based analysis, evaluate a probability mass function (PMF) (e.g., a function that gives the probability that a discrete random variable is exactly equal to some value), and/or evaluate an autocorrelation function (e.g., a function for performing cross-correlation on one's self). In some embodiments, entropy testing may be applied to a payload portion (e.g., 16 bytes or less). Using entropy testing, it may be determine whether a payload portion is random. If the payload portion is considered random (e.g., based on a PMF value), OTF module 104 may determine that a packet contains opaque data and may handle the packet or an associated flow accordingly.

In some embodiments, an autocorrelation function may be used in differentiating between compressed or encrypted data. For example, OTF module 104 may be configured to calculate autocorrelation on a payload portion (e.g., 8 bytes) of a packet. In this example, OTF module 104 may compare the payload portion to various time-shifted versions of itself to determine an autocorrelation value. The autocorrelation value may be used to determine whether a packet contains encrypted data or compressed data. For example, compressed data may be slightly less random than encrypted data and, as such, compressed data may be indicated by a higher absolute autocorrelation value. In some embodiments, if an autocorrelation value is higher than a certain threshold value, it may be determined that the packet contains compressed or encrypted data. If a second threshold value is exceeded, it may be determined that the packet contains encrypted data.

In some embodiments, OTF module 104 may be configured to evaluate a packet using available contextual information from the flow of which the packet is a part. For example, observing opaque packets in one direction only (e.g., client-to-server) may indicate that the packet and flow are compressed rather than encrypted.

In some embodiments, OTF module 104 and/or DAG module 101 may be configured to perform one or more aspects of statistical fingerprinting. For example, statistical fingerprinting may be a technique usable for identifying protocols associated with opaque data traffic. OTF module 104 and/or DAG module 101 may observe various visible or ascertainable characteristics (e.g., size of packets, packet header information, arrival time and/or order of packets) of packets or streams of packets containing opaque data. Using observed characteristics and known properties about various protocols, OTF module 104 and/or DAG module 101 may identify a protocol that corresponds to the observed characteristics of a packet or stream (e.g., a session or flow). OTF module 104 and/or DAG module 101 may store an association between the identified protocol and the data and may provide a confidence indicator for indicating the accuracy of the association. OTF module 104 and/or another module or node may use the identified protocol in determining how to process the data. For example, OTF module 104 and/or DAG module 101 may analyze one or more packets and determine that the packets are related to an encrypted secure shell (SSH) session. OTF module 104 and/or DAG module 101 may send or divert the packets to other notes for relevant processing based on statistical fingerprinting information. OTF module 104 and/or DAG module 101 may also provide relevant statistical fingerprinting information to the other nodes (e.g., DPI engine(s) 106 or opaque traffic analysis engine(s) 108).

OTF module 104, DAG module 101, and/or DPI engine(s) 106 may analyze a session or flow (e.g., one or more related packets) for opaque or transparent data using header information and/or flow-related information. For example, OTF module 104 may use a five tuple (e.g., a source IP address, a destination IP address, a source port, a destination port, and a protocol) in determining whether one or more packets include opaque or transparent data. Using header information and/or minimum payload inspection as described herein, OTF module 104, DAG module 101, and/or DPI engine(s) 106 may determine that a session or packets within the session contains opaque data. Based on this determination, OTF module 104, DAG module 101, and/or DPI engine(s) 106 may determine whether DPI engine(s) 106 or opaque traffic analysis engine(s) 108 handles further processing of the session or packets within the session.

OTF module 104 may periodically or aperiodically (e.g., dynamically) observe and analyze packets from a session or flow of packets. For example, OTF module 104 may sample one or more packets from a previously analyzed flow of packets to determine whether the flow has changed from opaque data to transparent data or vice versa. In some embodiments, OTF module 104 may be configured to detect a status change in a flow of related packets and notify relevant nodes about the status change. For example, at an initial time, a session between two nodes may be identified as communicating opaque traffic. Based on this determination, OTF module 104 may divert the traffic away from DPI engine(s) 106 or may inform DPI engine(s) 106 so that DPI engine(s) 106 appropriately handles the traffic. If, at some subsequent point in time, OTF module 104 determines that the session includes transparent traffic (e.g., packets containing plaintext), OTF module 104 may inform DPI engine(s) 106 or another node that the session includes transparent traffic. In response to being notified a session includes transparent traffic, DPI engine(s) 106 or another node may inspect traffic from the session and/or perform other appropriate actions.

In some embodiments, DAG 101 and/or OTF module 104 may be configure to perform parallel processing, such that multiple packets (e.g., from different sessions or links) may be analyzed concurrently. For example, OTF module 104 may be configured to perform entropy-based analysis and/or statistical hypothesis-based analysis. The analysis may be used to determine whether a packet contains opaque data. After a determination is made, appropriate actions may be performed, e.g., preventing opaque data traffic from being analyzed by DPI engine(s) 106 and/or sending opaque data traffic to an opaque data analysis engine(s) 108 for further processing.

It will be appreciated that FIG. 11 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 12:
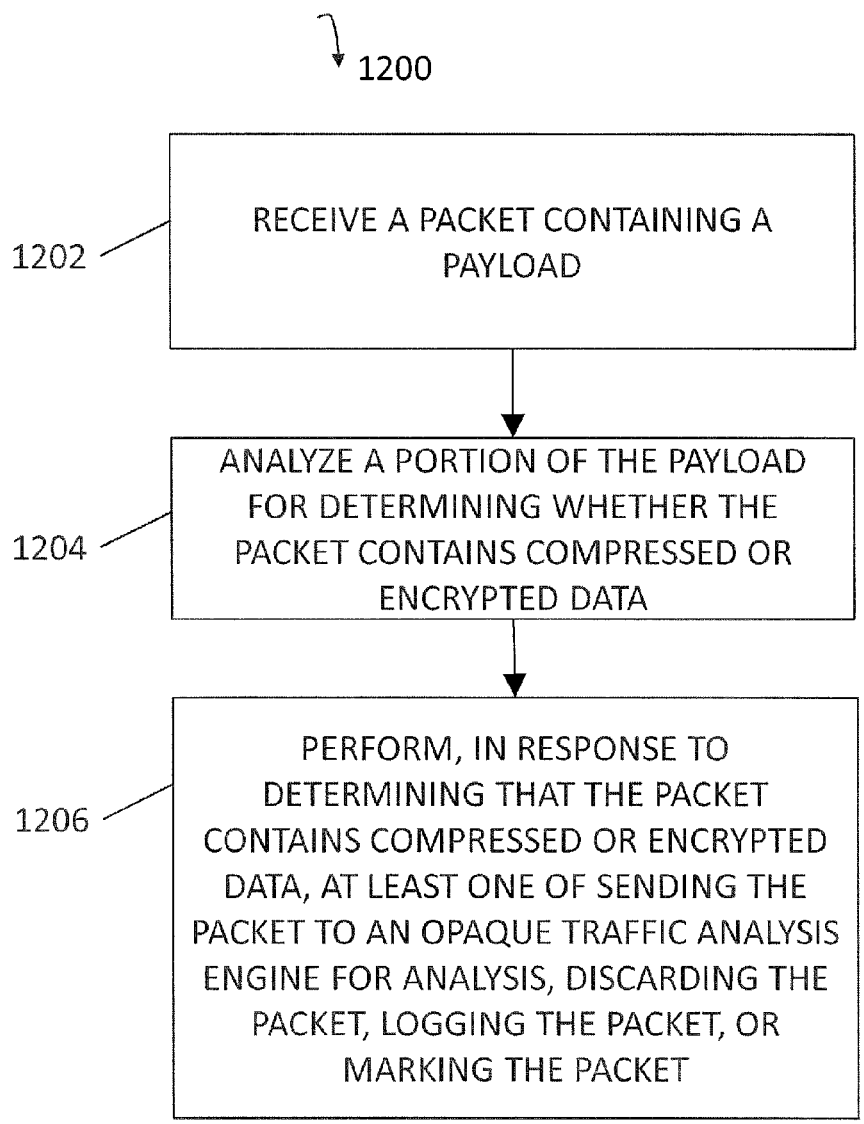
FIG. 12 is a diagram illustrating an exemplary process for rapid filtering of opaque data traffic according to an embodiment of the subject matter described herein.

FIG. 12 is a diagram illustrating an exemplary process 1200 for rapid filtering of opaque data traffic according to an embodiment of the subject matter described herein. In some embodiments, exemplary process 1200, or portions thereof, may be performed by or at DAG 101, tap 102, OTF module 104, DPI engine(s) 106, opaque traffic analysis engine(s) 108, a network node (e.g., a router, network address translator (NAT), or firewall), a general-purpose processor, a graphics processing unit (GPU), a specialized processor, and/or another node or module.

In step 1202, a packet containing a payload may be received. For example, receiving a packet may include observing and copying the packet from a plurality of packets traversing a link or node using tap 102.

In step 1204, a portion of the payload may be analyzed for determining whether the packet contains compressed or encrypted data.

In some embodiments, a portion of the payload analyzed may be less than or equal to the entire payload.

In some embodiments, a portion of the payload analyzed may include about 16 bytes or less than 16 bytes.

In some embodiments, analyzing a portion of the payload for determining whether the packet contains compressed or encrypted data may include analyzing a bit value distribution, a byte value distribution, or an sample entropy distribution of the portion of the payload for determining whether the payload includes uniformly distributed bit, byte, or sample entropy values.

In some embodiments, determining that a payload includes uniformly distributed bit, byte, or sample entropy values may indicate that the packet contains compressed or encrypted data.

In some embodiments, determining whether a payload packet contains compressed or encrypted data may include using at least one of a sequential hypothesis test, a fixed sample-size hypothesis test, or an autocorrelation function.

In step 1206, a mitigation action may be performed in response to determining that the packet contains compressed or encrypted data. For example, a mitigation action may include at least one of sending the packet to an opaque traffic analysis engine for analysis, discarding the packet, logging the packet, or marking the packet.

In some embodiments, at least one of a sequential hypothesis test, a fixed sample-size hypothesis test, or an autocorrelation function may be used in differentiating an encrypted packet and a compressed packet.

In some embodiments, receiving, analyzing, and performing steps may be performed by DAG 101, a GPU, or a general-purpose processor.

In some embodiments, a processor or device (e.g., DAG 101, a GPU, or a general-purpose processor) may be configured to perform statistical hypothesis tests and/or statistical fingerprinting in parallel (e.g., with other processors in a system).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for rapid filtering of opaque data traffic, the method comprising:
   at an opaque traffic filter (OTF) module implemented using software executed by a processor, wherein the processor includes a data acquisition and generation card (DAG), a graphics processing unit (GPU), or a general-purpose processor:
   receiving a packet containing a payload;
   analyzing a portion of the payload to determine whether the packet contains compressed or encrypted data, wherein analyzing the portion of the payload to determine whether the packet contains compressed or encrypted data includes using a null hypothesis indicating the portion of the payload is opaque data and an alternate hypothesis indicating that the portion of the payload is transparent data, wherein the alternate hypothesis uses a probability density indicating that a majority of byte values in the portion of the payload are ASCII values, wherein determining that the packet contains compressed or encrypted data includes determining that a byte value distribution of the portion of the packet supports the null hypothesis and fails to support the alternate hypothesis, wherein determining whether the packet contains compressed or encrypted data includes using at least one of a fixed sample-size hypothesis test or an autocorrelation function; and performing in response to determining that the packet contains compressed or encrypted data, at least one of sending the packet to an opaque traffic analysis engine for analysis, discarding the packet, logging the packet, or marking the packet, wherein the receiving, the analyzing, and the performing are performed by the data acquisition and generation card (DAG), the graphics processing unit (GPU), or the general-purpose processor.

2. The method of claim 1 wherein receiving the packet includes observing and copying the packet from a plurality of packets traversing a link or node.

3. The method of claim 1 wherein the portion of the payload analyzed is less than or equal to the entire payload.

4. The method of claim 1 wherein the portion of the payload analyzed includes about 16 bytes or less than 16 bytes.

5. The method of claim 1 wherein determining that the portion of the payload includes uniformly distributed byte values indicates that the packet contains compressed or encrypted data.

6. The method of claim 1 wherein at least one of a sequential hypothesis test, the fixed sample-size hypothesis test, or the autocorrelation function is used in differentiating an encrypted packet and a compressed packet.

7. The method of claim 1 wherein the DAG, the GPU, or the general-purpose processor performs statistical hypothesis tests or statistical fingerprinting.

8. A system for rapid filtering of opaque data traffic, the system comprising:
 a processor, wherein the processor includes a data acquisition and generation card (DAG), a graphics processing unit (GPU), or a general-purpose processor; and
 an opaque traffic filter (OTF) module implemented using software executed by the processor, the OTF module configured to receive a packet containing a payload, to analyze a portion of the payload to determine whether the packet contains compressed or encrypted data, wherein analyzing the portion of the payload to determine whether the packet contains compressed or encrypted data includes using a null hypothesis indicating the portion of the payload is opaque data and an alternate hypothesis indicating that the portion of the payload is transparent data, wherein the alternate hypothesis uses a probability density indicating that a majority of byte values in the portion of the payload are ASCII values, wherein determining that the packet contains compressed or encrypted data includes determining that a byte value distribution of the portion of the packet supports the null hypothesis and fails to support the alternate hypothesis, wherein determining whether the packet contains compressed or encrypted data includes using at least one of a fixed sample-size hypothesis test or an autocorrelation function, and to perform, in response to determining that the packet contains compressed or encrypted data, at least one of sending the packet to an opaque traffic analysis engine for analysis, discarding the packet, logging the packet, or marking the packet.

9. The system of claim 8 wherein the system comprises a communications interface configured to observe and copy the packet from a plurality of packets traversing a link or node.

10. The system of claim 8 wherein the portion of the payload analyzed is less than or equal to the entire payload.

11. The system of claim 8 wherein the portion of the payload analyzed includes about 16 bytes or less than 16 bytes.

12. The system of claim 8 wherein determining that the portion of the payload includes uniformly distributed byte values indicates that the packet contains compressed or encrypted data.

13. The system of claim 8 wherein the OTF module is configured to use at least one of a sequential hypothesis test, the fixed sample-size hypothesis test, or the autocorrelation function in differentiating an encrypted packet and a compressed packet.

14. The system of claim 8 wherein the OTF module is configured to inform a packet inspection analysis engine when a session becomes opaque or transparent and/or when a packet of the session is examined that does not match an expected type for the session.

15. The system of claim 8 wherein the processor performs statistical hypothesis tests or statistical fingerprinting.

16. A non-transitory computer readable medium having stored thereon executable instructions that when executed by a processor of a computer control the computer to perform steps comprising:
 at an opaque traffic filter (OTF) module implemented using software executed by a processor, wherein the processor includes a data acquisition and generation card (DAG), a graphics processing unit (GPU), or a general-purpose processor:
  receiving a packet containing a payload;
  analyzing a portion of the payload to determine whether the packet contains compressed or encrypted data, wherein analyzing the portion of the payload to determine whether the packet contains compressed or encrypted data includes using a null hypothesis indicating the portion of the payload is opaque data and an alternate hypothesis indicating that the portion of the payload is transparent data, wherein the alternate hypothesis uses a probability density indicating that a majority of byte values in the portion of the payload are ASCII values, wherein determining that the packet contains compressed or encrypted data includes determining that a byte value distribution of the portion of the packet supports the null hypothesis and fails to support the alternate hypothesis, wherein determining whether the packet contains compressed or encrypted data includes using at least one of a fixed sample-size hypothesis test or an autocorrelation function; and
  performing, in response to determining that the packet contains compressed or encrypted data, at least one of sending the packet to an opaque traffic analysis engine for analysis, discarding the packet, logging the packet, or marking the packet, wherein the receiving, the analyzing, and the performing are performed by a data acquisition and generation card (DAG), a graphics processing unit (GPU), or a general-purpose processor.

* * * * *